United States Patent
Li

(10) Patent No.: US 11,376,527 B2
(45) Date of Patent: Jul. 5, 2022

(54) PRODUCTION SYSTEM FOR FORMING FILTRATION TUBES INCLUDING SUBSYSTEMS AND METHOD OF USING SAME

(71) Applicant: Synfuel Americas Corporation, Sterling, VA (US)

(72) Inventor: Yongwang Li, Beijing (CN)

(73) Assignee: SYNFUEL AMERICAS CORPORATION, Sterling, VA (US)

(*) Notice: Subject to any disclaimer, the term of this patent is extended or adjusted under 35 U.S.C. 154(b) by 185 days.

(21) Appl. No.: 16/584,835

(22) Filed: Sep. 26, 2019

(65) Prior Publication Data

US 2020/0101405 A1    Apr. 2, 2020

Related U.S. Application Data

(60) Provisional application No. 62/738,919, filed on Sep. 28, 2018.

(51) Int. Cl.
*B01D 29/11* (2006.01)
*B23K 26/03* (2006.01)
(Continued)

(52) U.S. Cl.
CPC ........ *B01D 29/111* (2013.01); *B23K 26/0093* (2013.01); *B23K 26/032* (2013.01);
(Continued)

(58) Field of Classification Search
CPC .... B23K 37/0276; B23K 37/00; B23K 37/04; B23K 37/047; B23K 37/0426; B23K 37/0435; B23K 37/0443
See application file for complete search history.

(56) References Cited

U.S. PATENT DOCUMENTS

2003/0208302 A1    11/2003  Lemelson et al.
2008/0302769 A1*   12/2008  Yamazaki .......... B23K 37/0538
                                                      219/121.67
(Continued)

FOREIGN PATENT DOCUMENTS

CN    207753927 U    8/2018
JP    2018080998 A   5/2018
(Continued)

OTHER PUBLICATIONS

International Preliminary Report on Patentability issued in corresponding PCT Patent Application No. PCT/US2019/053312, dated Apr. 8, 2021.

(Continued)

*Primary Examiner* — John J Norton
(74) *Attorney, Agent, or Firm* — Pillsbury Winthrop Shaw Pittman, LLP

(57) ABSTRACT

A production system and method of using the same for forming filtration tubes. The system includes: a six-axis robotic arm that moves tubes between sub-systems. The arm moves an unprocessed tube from an input-output subsystem, to an inspection system, a laser cutting system, and optional post-processing system. The inspection may include a laser and/or camera that scans a surface of a tube to determine abnormalities, defects, and/or quality issues. The laser cutting system cuts pores, holes, or slots into and through a wall of the tube, that passes inspection, to form a filtration tube used to filter solids from fluids. The post-processing system may post-process and/or clean the tube after cutting. If the tube fails inspection, it is moved to a reject bin or tray. The arm moves completed filtration tubes to a finished tube bin or tray.

26 Claims, 26 Drawing Sheets

(51) Int. Cl.
*B23K 26/08* (2014.01)
*B23K 26/00* (2014.01)
*B23K 26/38* (2014.01)
*B23K 37/02* (2006.01)
*G01N 21/952* (2006.01)
*B23K 26/70* (2014.01)

(52) U.S. Cl.
CPC .......... *B23K 26/0823* (2013.01); *B23K 26/38* (2013.01); *B23K 26/702* (2015.10); *B23K 37/0276* (2013.01); *G01N 21/952* (2013.01)

(56) References Cited

U.S. PATENT DOCUMENTS

| | | | |
|---|---|---|---|
| 2012/0067104 A1* | 3/2012 | Keys | ........................ B23P 19/10 72/379.2 |
| 2017/0249729 A1 | 8/2017 | Greene et al. | |
| 2018/0209890 A1 | 7/2018 | Case et al. | |

FOREIGN PATENT DOCUMENTS

| | | | |
|---|---|---|---|
| WO | 2018/092441 A1 | 5/2018 | |
| WO | WO-2018191890 A1 * | 10/2018 | ........... B23K 37/047 |

OTHER PUBLICATIONS

Canadian Examiner's Report issued in corresponding Canadian Patent Application No. 3,114,622, dated May 4, 2021.
International Search Report and Written Opinion issued in corresponding PCT/US2019/053312 dated Jan. 13, 2020 (10 pages).
Examination Report issued in corresponding Indian Patent Application No. 202147018577, dated Jul. 5, 2021.

* cited by examiner

PRODUCTION SYSTEM FOR FORMING FILTRATION TUBES INCLUDING SUBSYSTEMS AND METHOD OF USING SAME

CROSS-REFERENCE TO RELATED APPLICATIONS

This application claims the benefit of U.S. Provisional Patent Application No. 62/738,919, filed Sep. 28, 2018, which is hereby expressly incorporated by reference in its entirety.

BACKGROUND

Field

The present disclosure is generally related to a production system for processing and forming filtration tubes.

Description of Related Art

Filtration is an important method that typically is used to separate solids from fluids (gases or liquids) for a variety of industries, from oil and gas processing to even food processing industries. In most industrial processes that rely on filtration, the replacement of filtration media is very frequent, leading to significant cost increase and the rise of issues of processing or recovery of the solid wastes of used filtration media.

The filtration media currently available for industrial application are diverse. Filtration elements and assemblies formed from filtration tubes have been successful for filtering solids from liquids in a number of different industries.

Forming filtration tubes such that the tubes themselves and their pores are without defect is critical to accuracy in the filtering process.

Further, inspecting such tubes is necessary to confirm production of a consistent product as well as to produce satisfied customers.

SUMMARY

It is an aspect of this disclosure to provide a production system for processing and inspecting tubes in order to form filtration tubes. The system includes: a six-axis robotic arm configured to move tubes between a plurality of sub-systems. The sub-systems may include: a tube input-output subsystem configured to hold a plurality of tubes, an inspection system, and a laser cutting system. The robotic arm is configured to withdraw a tube for processing from the tube input-output subsystem. The inspection system is configured to receive and inspect placed therein by the robotic arm. The inspection system is configured to inspect the tube by scanning a surface of the tube to determine presence of abnormalities, defects, and/or quality issues. The laser cutting system is configured to receive the tube via the robotic arm moving said tube to the laser cutting system. The laser cutting system is configured to cut a plurality of slots, holes, and/or pores into and through a wall of the tube to form a filtration tube that is configured to filter solids from fluids.

In some cases, the robotic arm is configured to move the tube from the laser cutting system and into a post-processing system, e.g., a cleaning system to clean the tube cut by the laser cutting system. In an embodiment, the inspection system includes a pre-inspection system and a post inspection system. The robotic arm may be further configured to move the tube into a tray based on its inspection. For example, tubes that pass inspection and form filtration tubes are directed to one tray in the tube input-output subsystem, while tubes that fail are directed to another tray.

Another aspect provides a method for processing and inspecting filtration tubes using a production system comprising a six-axis robotic arm configured to move tubes between a plurality of sub-systems, the sub-systems comprising a tube input-output subsystem configured to hold a plurality of tubes, an inspection system, and a laser cutting system. The method includes: withdrawing a tube for processing from the tube input-output subsystem using the robotic arm; moving the tube using the robotic arm to the inspection system for inspection; inspecting the tube by scanning a surface of the tube using the inspection system to determine presence of abnormalities, defects, and/or quality issues in said tube and to determine each tube that has passed inspection or that is defective; and moving the inspected tube to the laser cutting system using the robotic arm, or, else, moving a defective tube having abnormalities and/or defects back to the tube input-output subsystem using the robotic arm. For each tube passing inspection, the method further includes cutting a plurality of slots, holes, and/or pores into and through a wall of each tube to form a filtration tube that is configured to filter solids from fluids using the laser cutting system.

In an embodiment wherein a post-processing system is provided in the system, the method further includes moving the cut tube from the laser cutting system into the post-processing system using the robotic arm; and applying post-processing technique(s) (e.g., cleaning) to the tube cut by the laser cutting system using the post-processing system.

The method may include moving the tube from the laser cutting system or from the post-processing system to the inspection system using the robotic arm; and inspecting the tube using the inspection system by scanning the surface of the tube to determine at least quality and porosity of the tube after being cut by the laser cutting system and to determine the tube that has passed inspection.

Other features and advantages of the present disclosure will become apparent from the following detailed description, the accompanying drawings, and the appended claims.

DETAILED DESCRIPTION

Figure 1A:
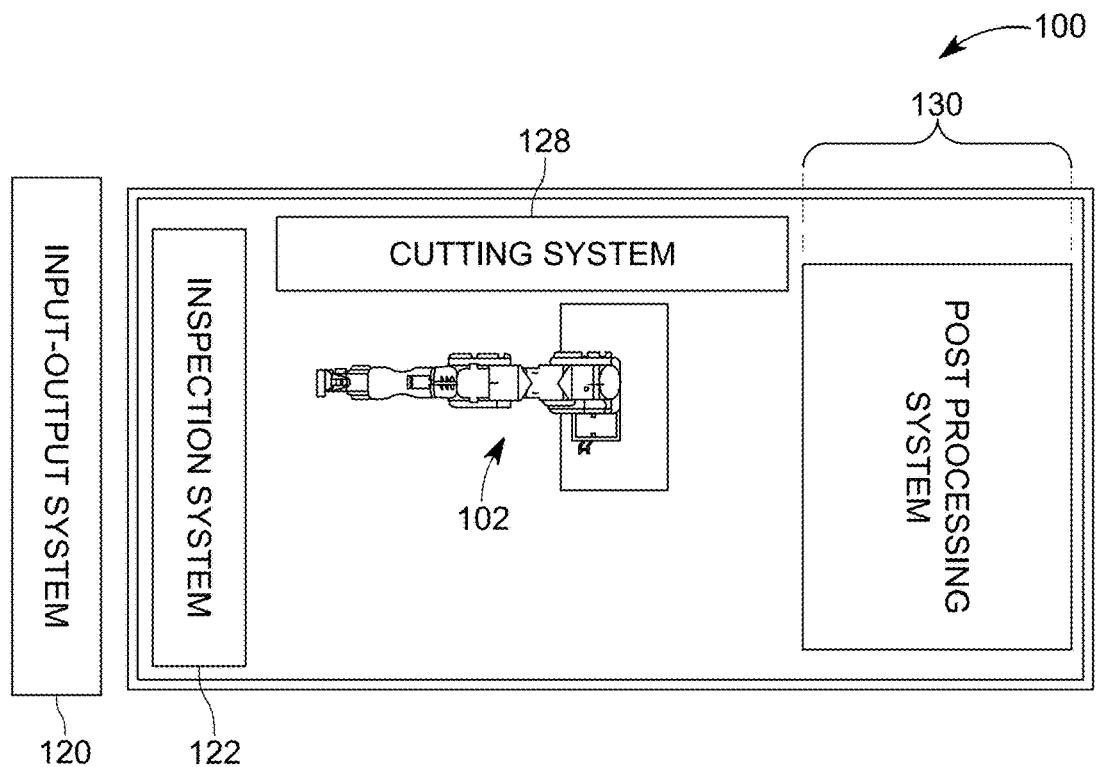
FIG. 1A is a schematic of a production system for processing and inspecting tubes to form filtration tubes, in accordance with an embodiment, having a robotic arm and subsystems therein.
Figure 1B:
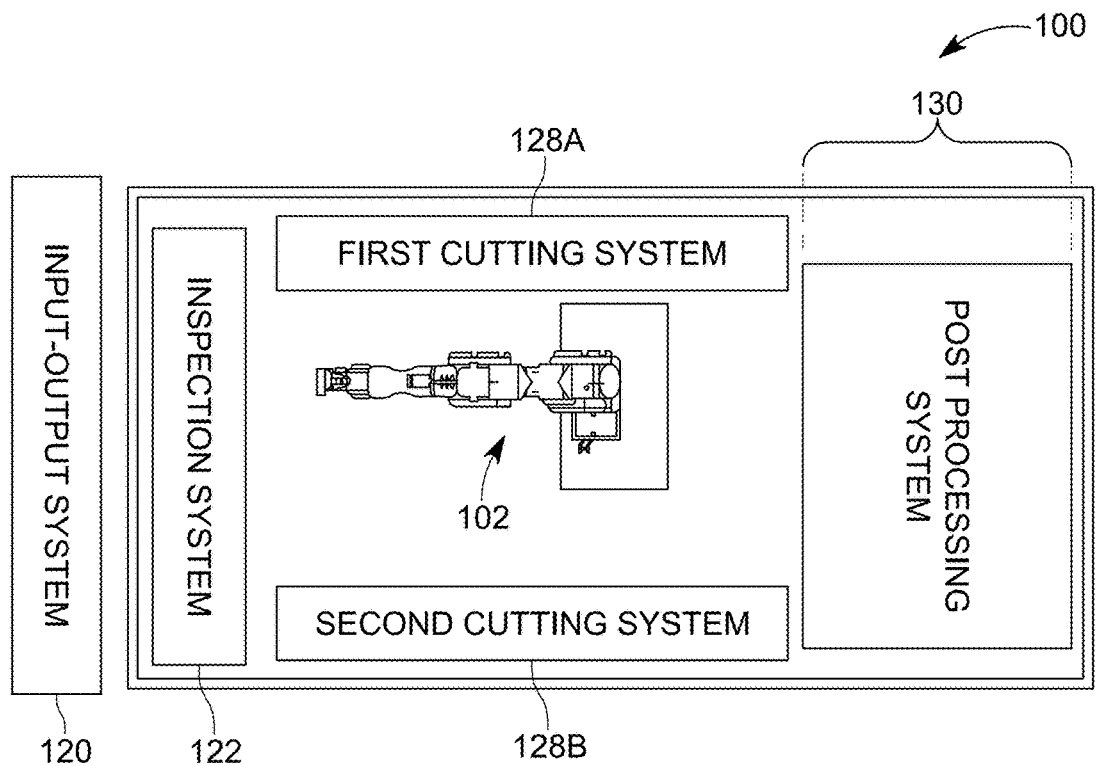
FIGS. 1B, 1C, 1D and 1E each are schematics of alternative production systems, in accordance with embodiments herein, including a robotic arm and subsystems therein.
Figure 1C:
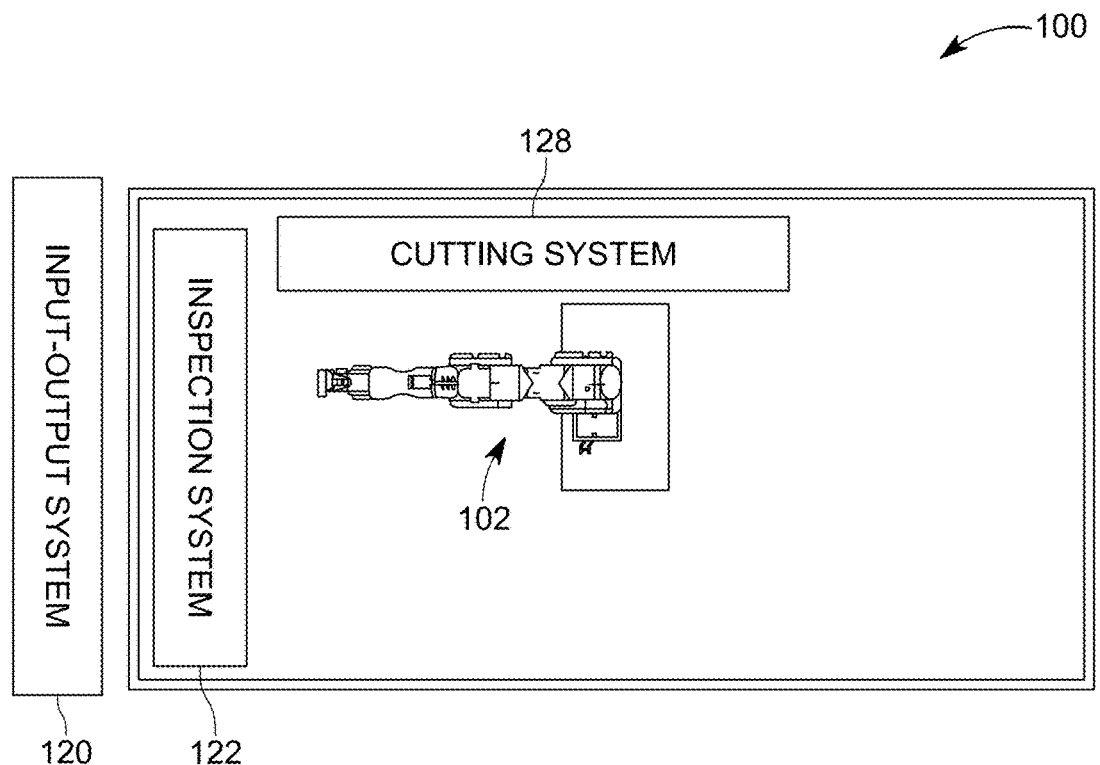
Figure 1D:
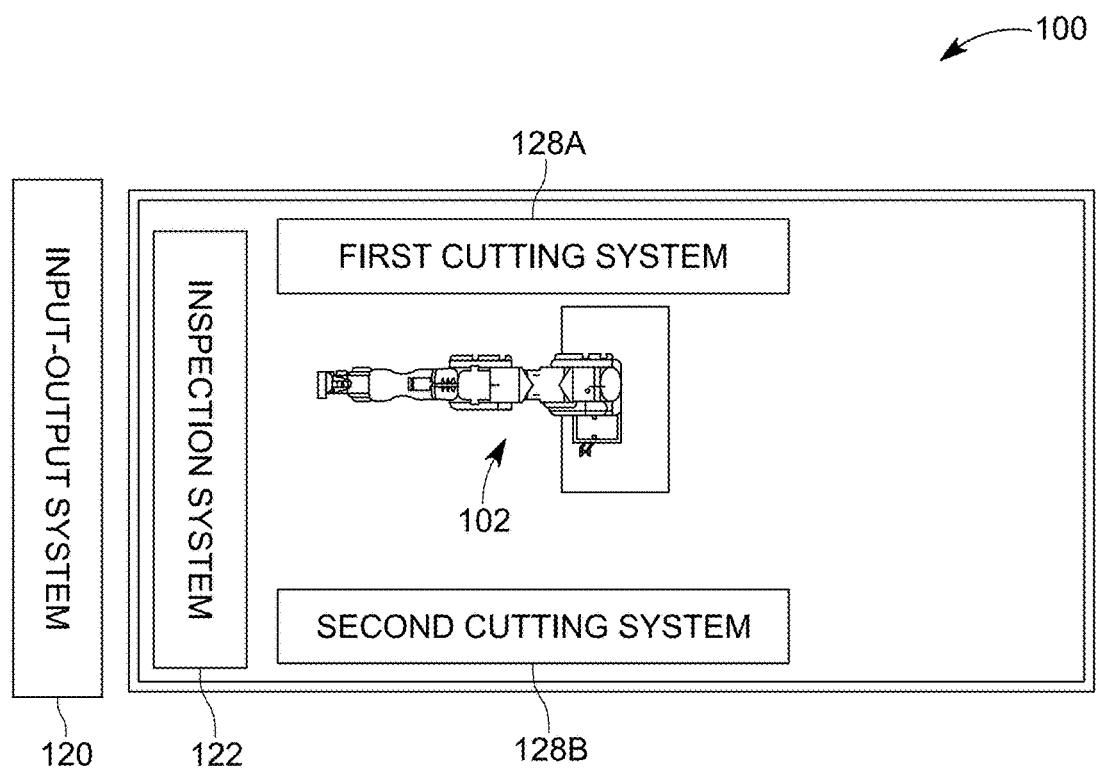
Figure 1E:
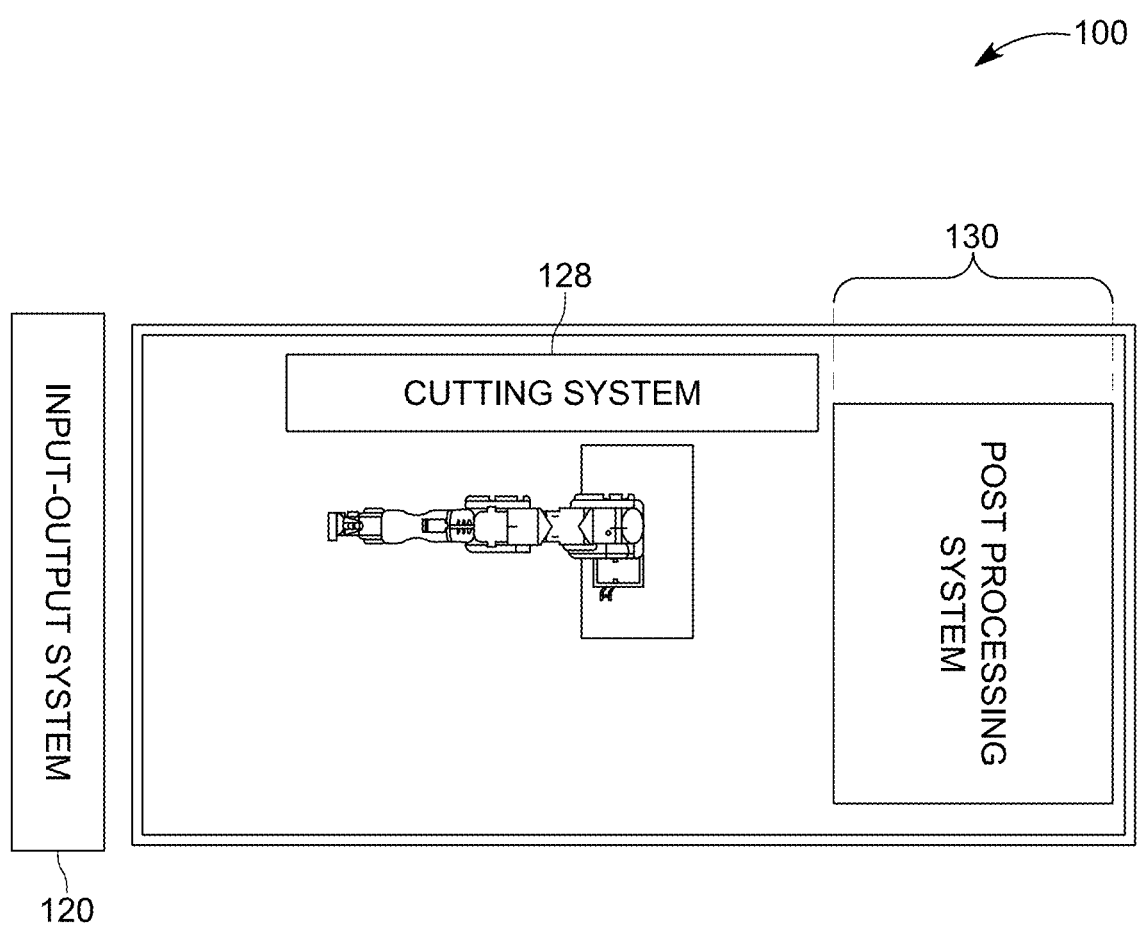

The herein disclosed production system 100 is used for processing and inspecting tubes used to form filtration tubes, and to discard any tubes that do not pass pre- or post-inspection. The system 100 includes a robotic arm 102 that moves tubes being processing between a number of subsystems, systems or stations, included therein. In accordance with one embodiment, which is schematically depicted in FIG. 1A, the system 100 includes, along with robotic arm 102, a tube input-output subsystem 120, an inspection system 122 (e.g., including a pre-inspection subsystem 124 and a post-inspection subsystem 126), a laser cutting system or subsystem 128 (or slotting subsystem, or hole cutting subsystem), and a post-processing subsystem 130 (e.g., for processing the laser cut tube; e.g., including a drying station, rinse tank, and/or a cleaning system, in accordance with one embodiment). In another embodiment, more than one laser cutting system 128 is included in the system 100; that is, an additional laser cutting system may be included. FIG. 1B illustrates a schematic example of a system 100 that includes robotic arm 102, a tube input-output subsystem 120, an inspection system 122 (e.g., including a pre-inspection subsystem 124 and a post-inspection subsystem 126), first and second laser cutting systems 128A and 128B, and a post-processing subsystem 130 (e.g., including a drying station, rinse tank, and/or an ultrasonic bath), in accordance with another embodiment. In yet another embodiment, the post-processing subsystem is not provided. For example, FIG. 1C illustrates yet another embodiment of a system 100 that includes robotic arm 102, a tube input-output subsystem 120, an inspection system 122, and a laser cutting system 128. Alternatively, in still yet another embodiment, FIG. 1D shows a system 100 that includes robotic arm 102, a tube input-output subsystem 120, an inspection system 122 (e.g., including a pre-inspection subsystem 124 and a post-inspection subsystem 126), first and second laser cutting systems 128A and 128B, and a post-processing subsystem 130 (e.g., including a drying station, rinse tank, and/or an ultrasonic bath), in accordance with another embodiment. Each of the systems 100 depicted in FIGS. 1A-1D are examples of arrangements and subsystems that may be used therein (their detailed description being provided below). In still yet another embodiment, any of the illustrated systems of FIGS. 1A-1D may be provided without an inspection system 122. For example, FIG. 1E illustrates yet another embodiment of a system 100 that includes robotic arm 102, a tube input-output subsystem 120, a laser cutting system 128, and an optional post-processing system 130. The number and type of systems/subsystems/stations included in the system 100 is not intended to be limited to the illustrated schematics included herewith. Also, while an additional or second laser cutting system is only depicted, it should be noted that still yet another laser cutting system, e.g., a third laser cutting system, may be provided in the system 100. As such, system 100 may include more than one laser cutting system in accordance with an embodiment. Moreover, the orientation and placement of the subsystems in the system 100 is not intended to be limited to the exemplary illustrated embodiments herein.

Adding a second or additional laser cutting system, such as shown in FIGS. 1B and 1D, may assist in increasing (e.g., doubling) the production rate of the system. For example, with two laser cutting systems, one of every other subsystem (inspection system, post-processing, robotic arm, etc.) may still be provided, since the processing time in each subsystem may vary and, in some cases, be less for the other subsystems as compared to the cutting time it takes to cut a tube. This may result in cost savings and also allow for a reduction in footprint since a second cutting system does not require much more additional area.

Figure 2A:
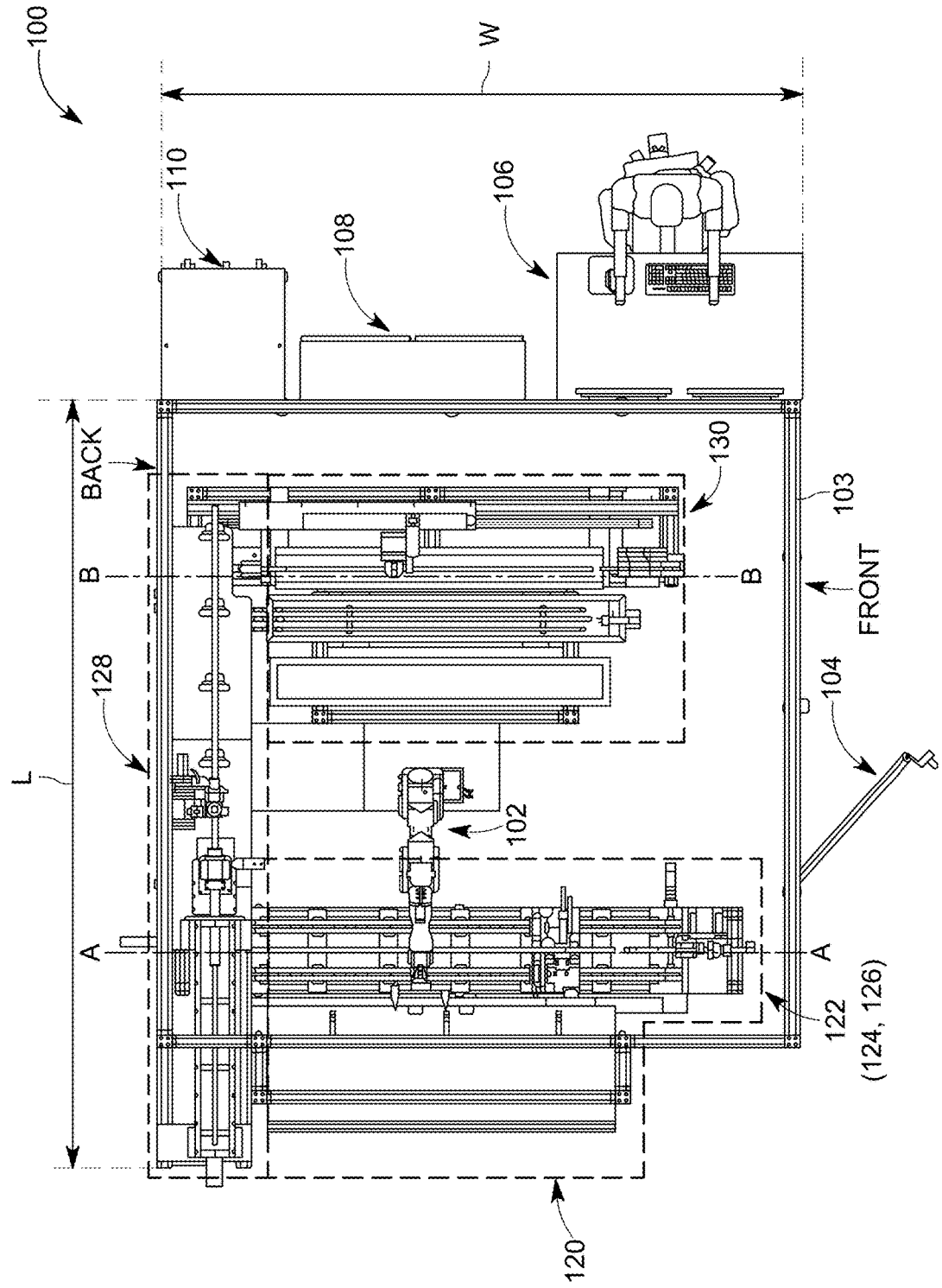
FIG. 2A is a top or overhead view of a production system for processing and inspecting tubes to form filtration tubes, in accordance with an embodiment herein schematically depicted in FIG. 1A, that includes a robotic arm and subsystems therein.
Figure 2B:
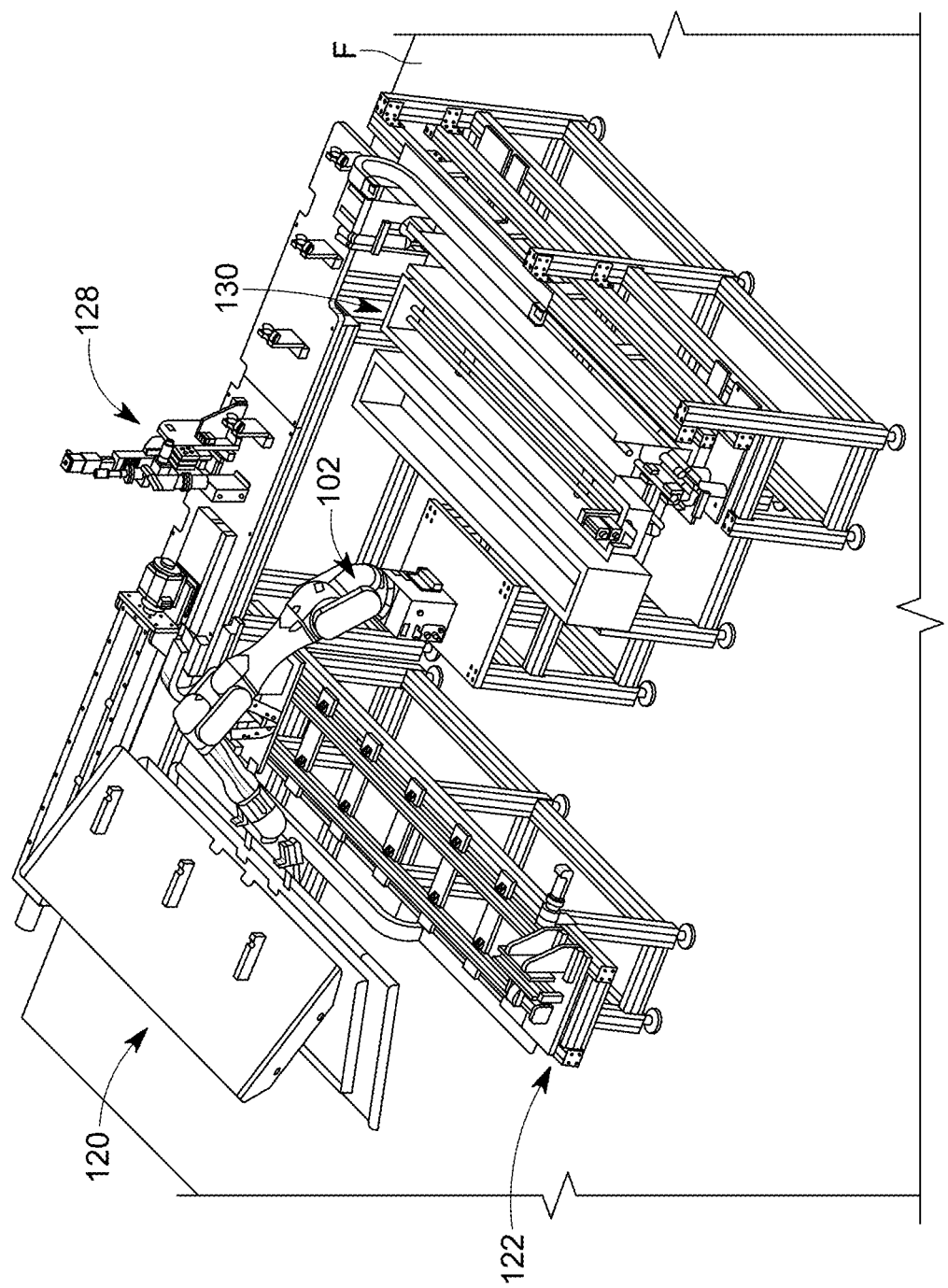
FIG. 2B is an overhead perspective view of the subsystems that may be provided in the production system of FIG. 2A.
Figure 15:
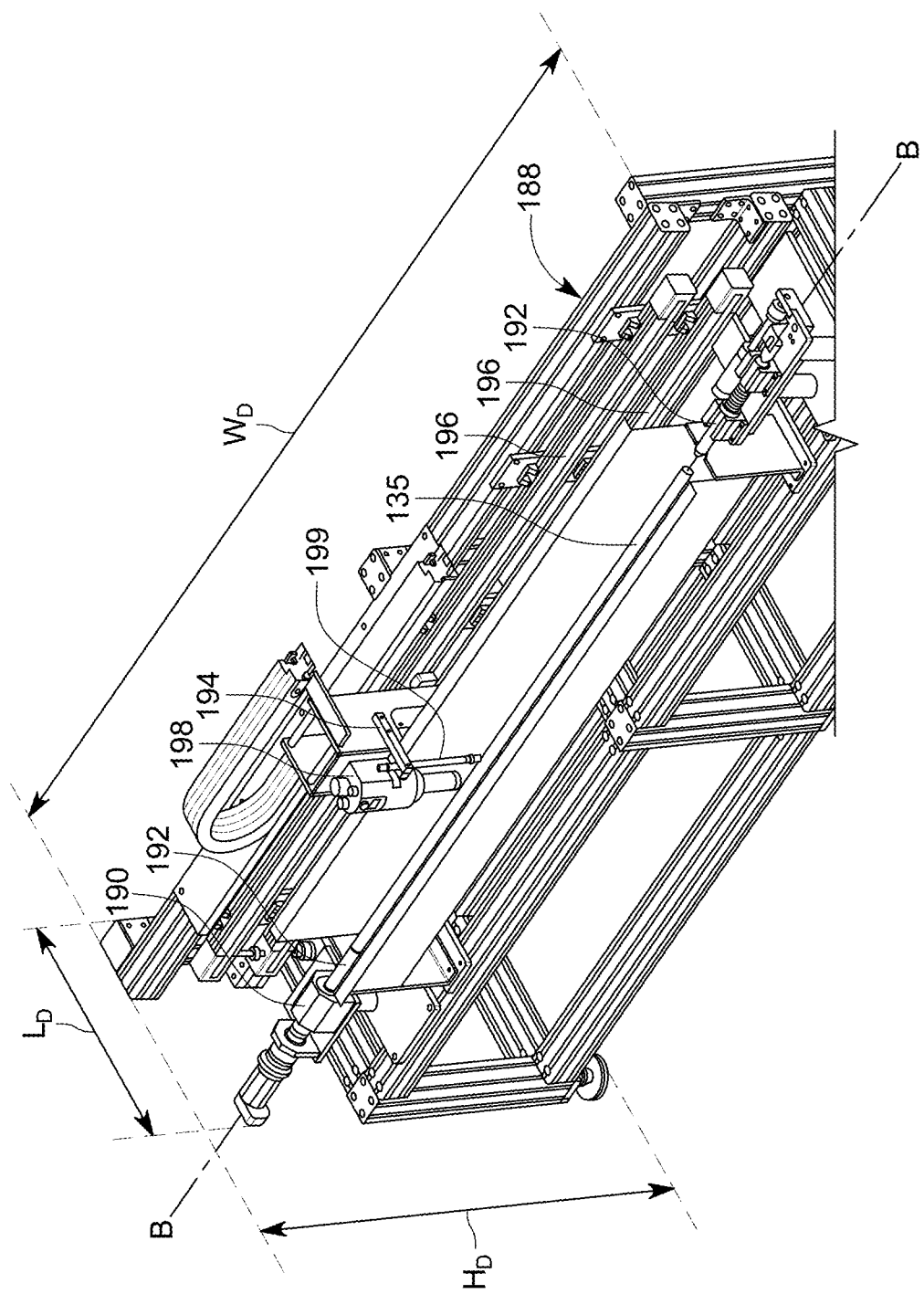
FIG. 15 is an angled view of a drying system that is part of the post-processing system of FIG. 13 in accordance with an embodiment.
Figure 16:
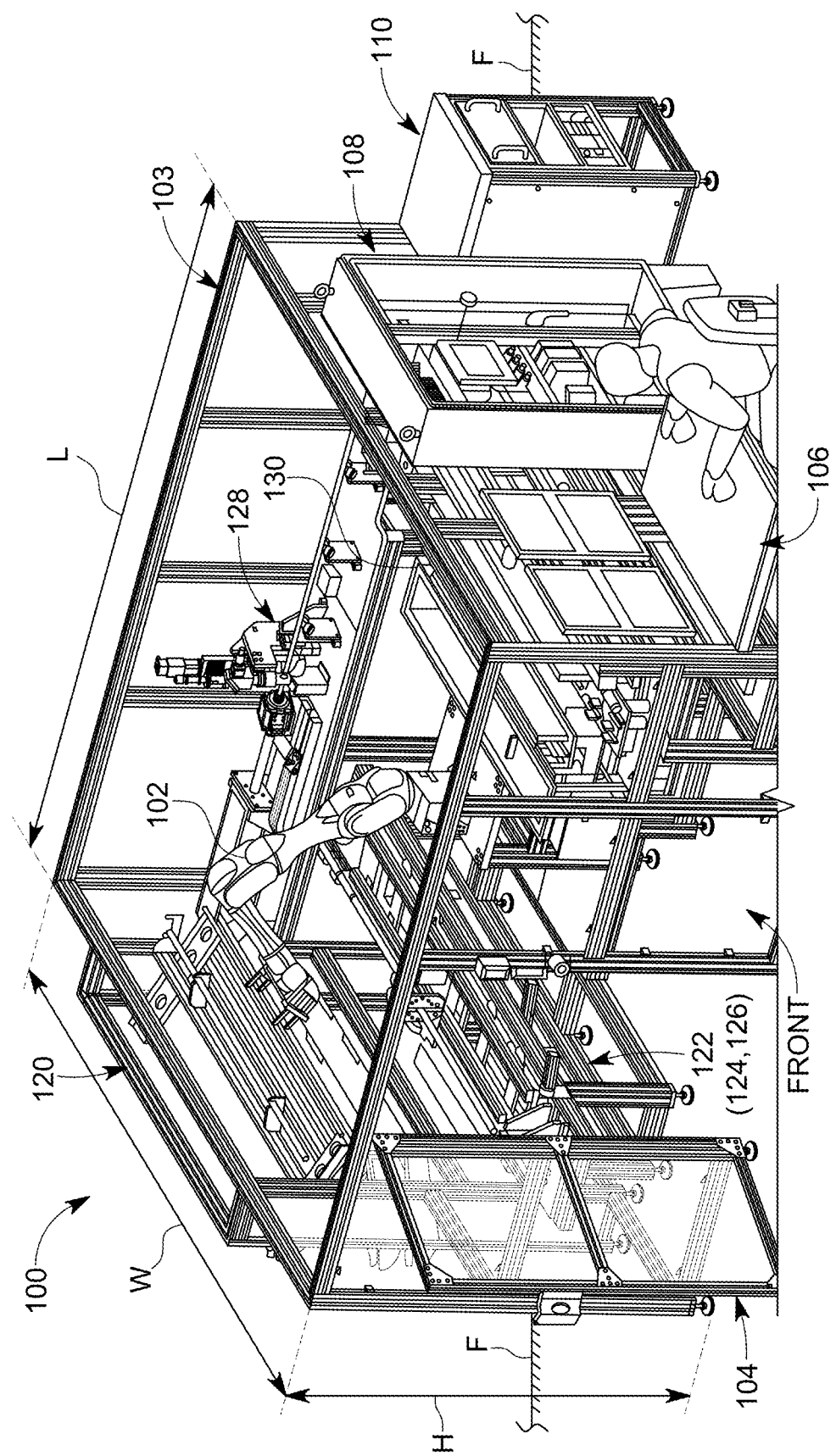
FIG. 16 is an overhead perspective view of the production system of FIGS. 2A-2B, showing the robotic arm starting the herein disclosed method at the tube input-output subsystem.
Figure 17:
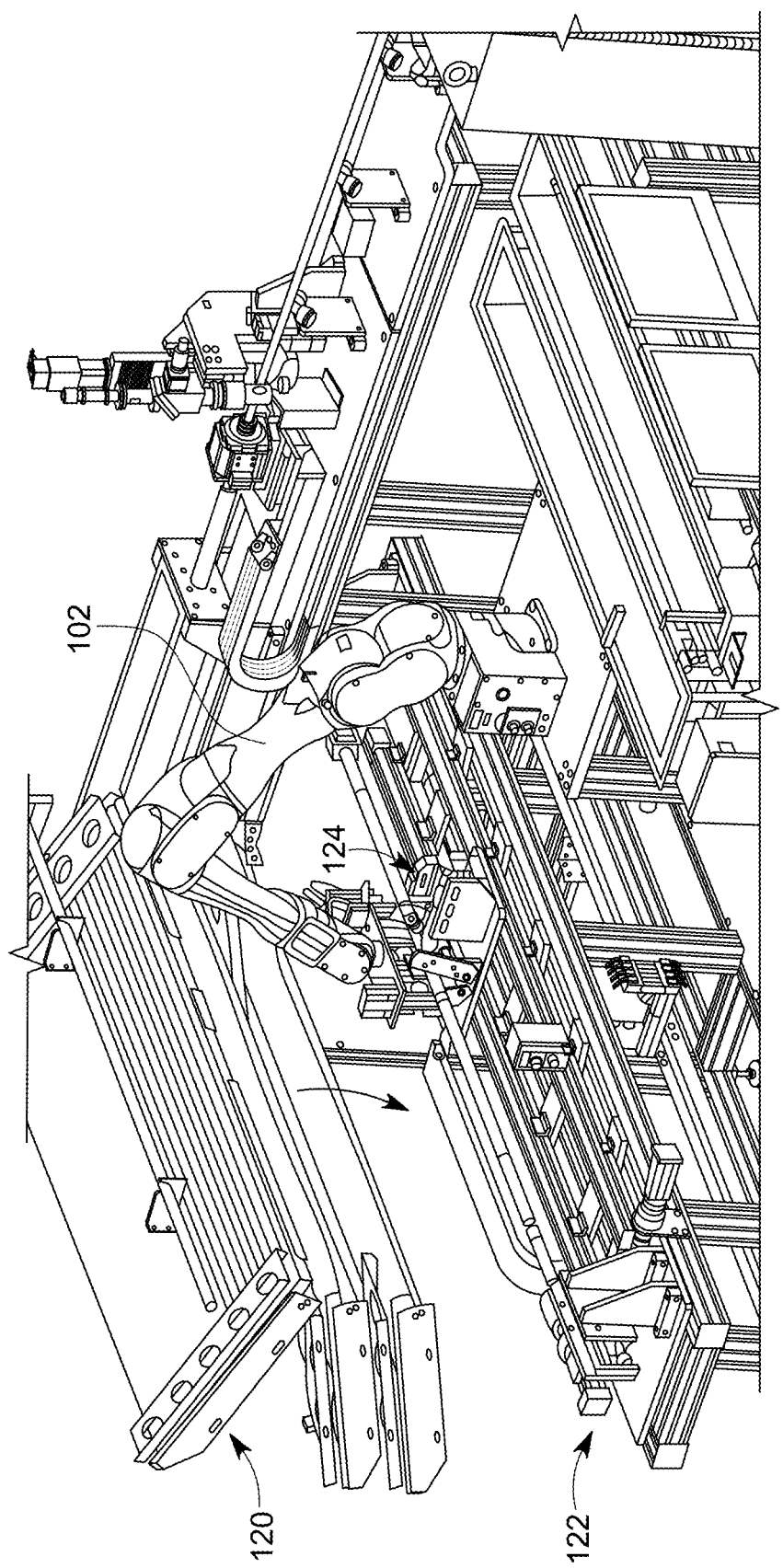
FIGS. 17-23 illustrate different steps of the method and movement of the robotic arm and tube through the subsystems of the production system of FIGS. 2A-2B in accordance with an embodiment.
Figure 18:
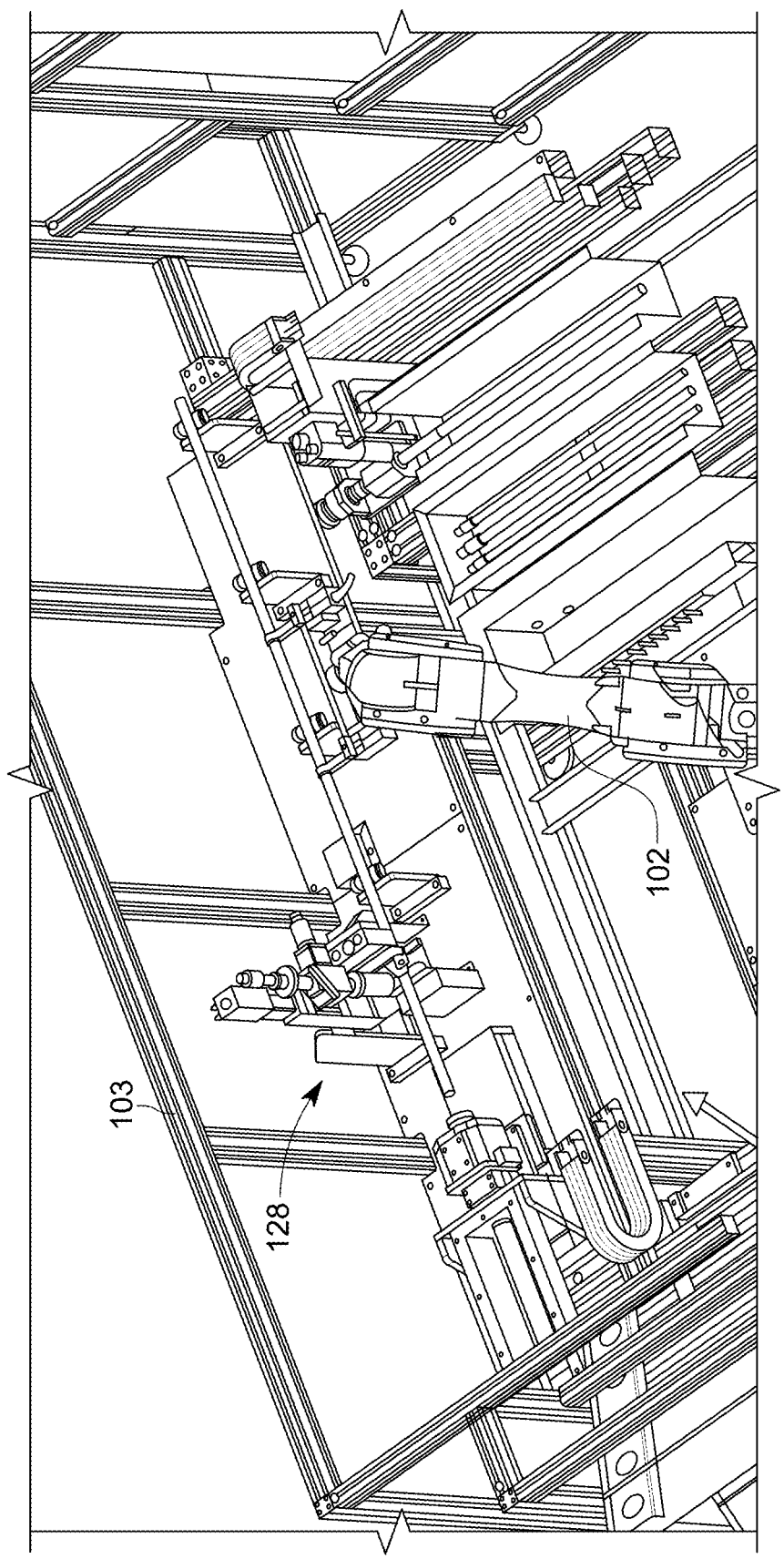
Figure 19:
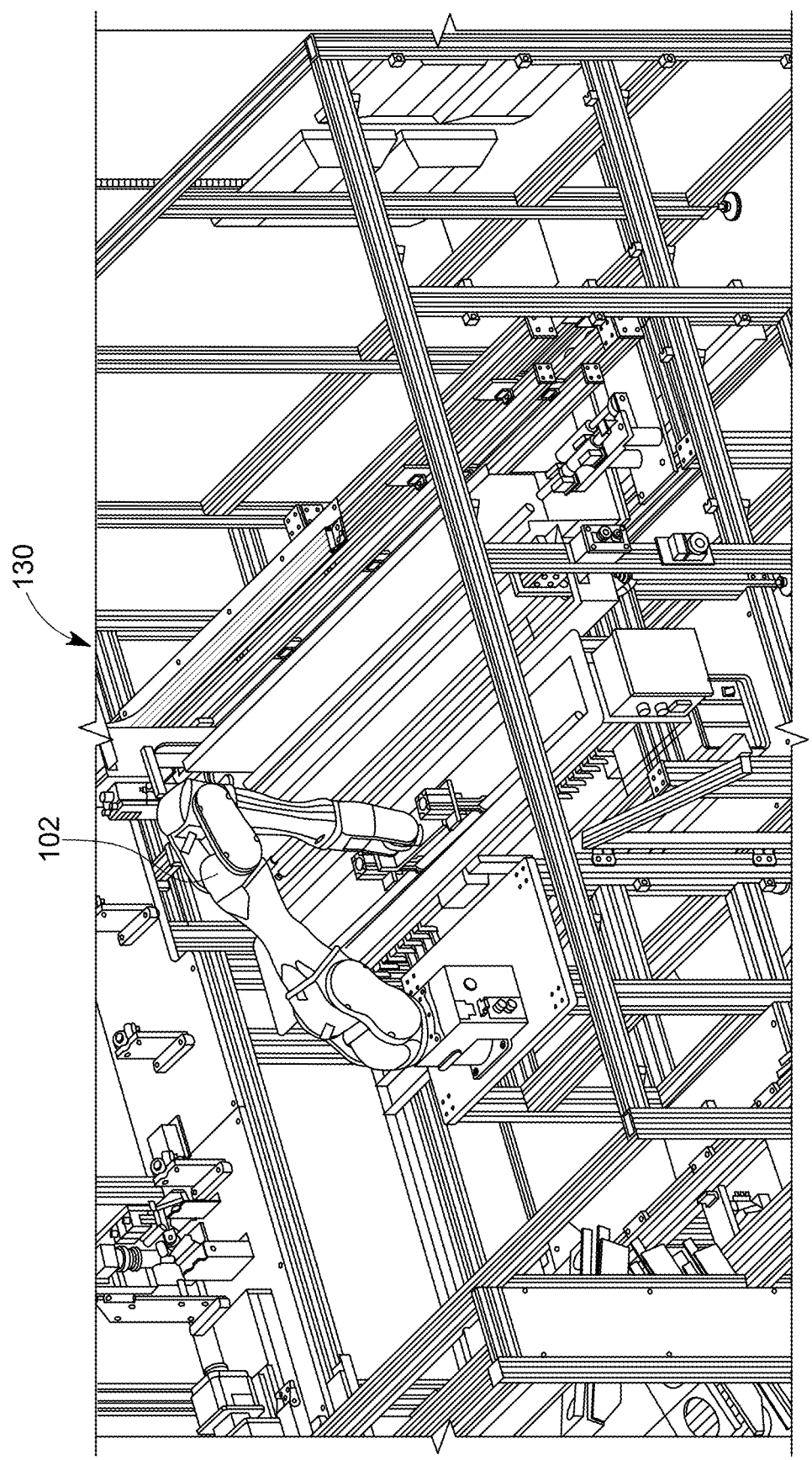
Figure 20:
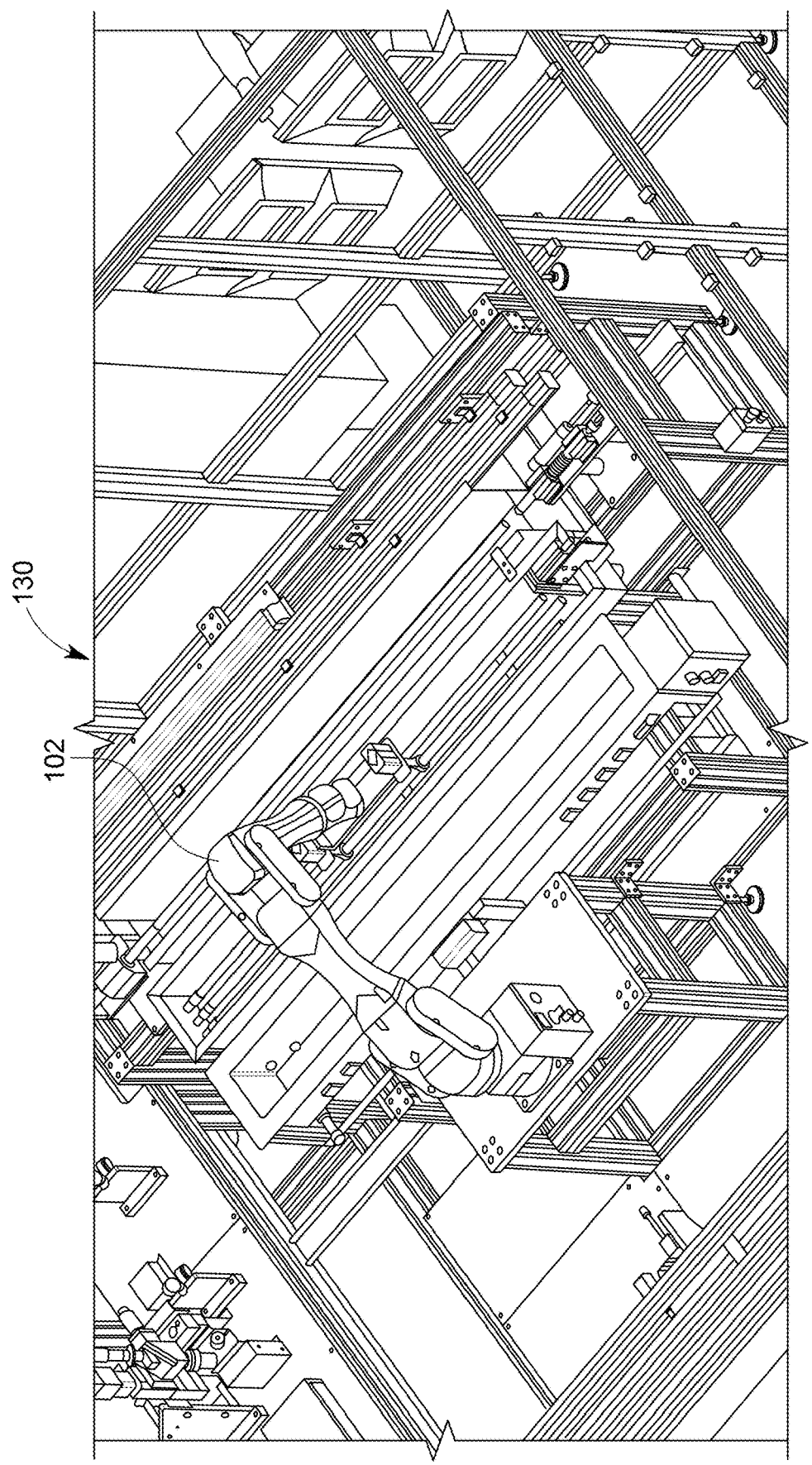
Figure 21:
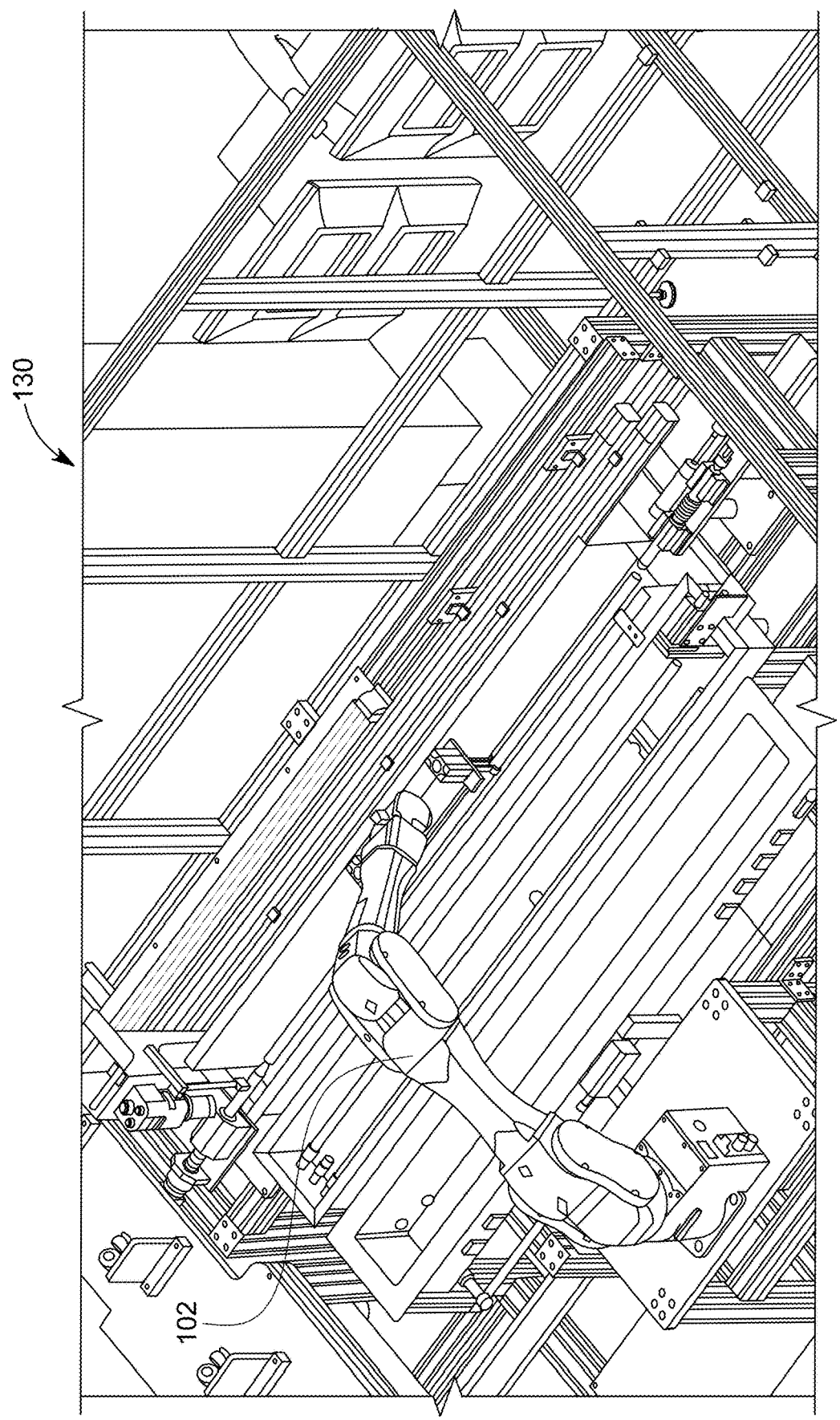
Figure 22:
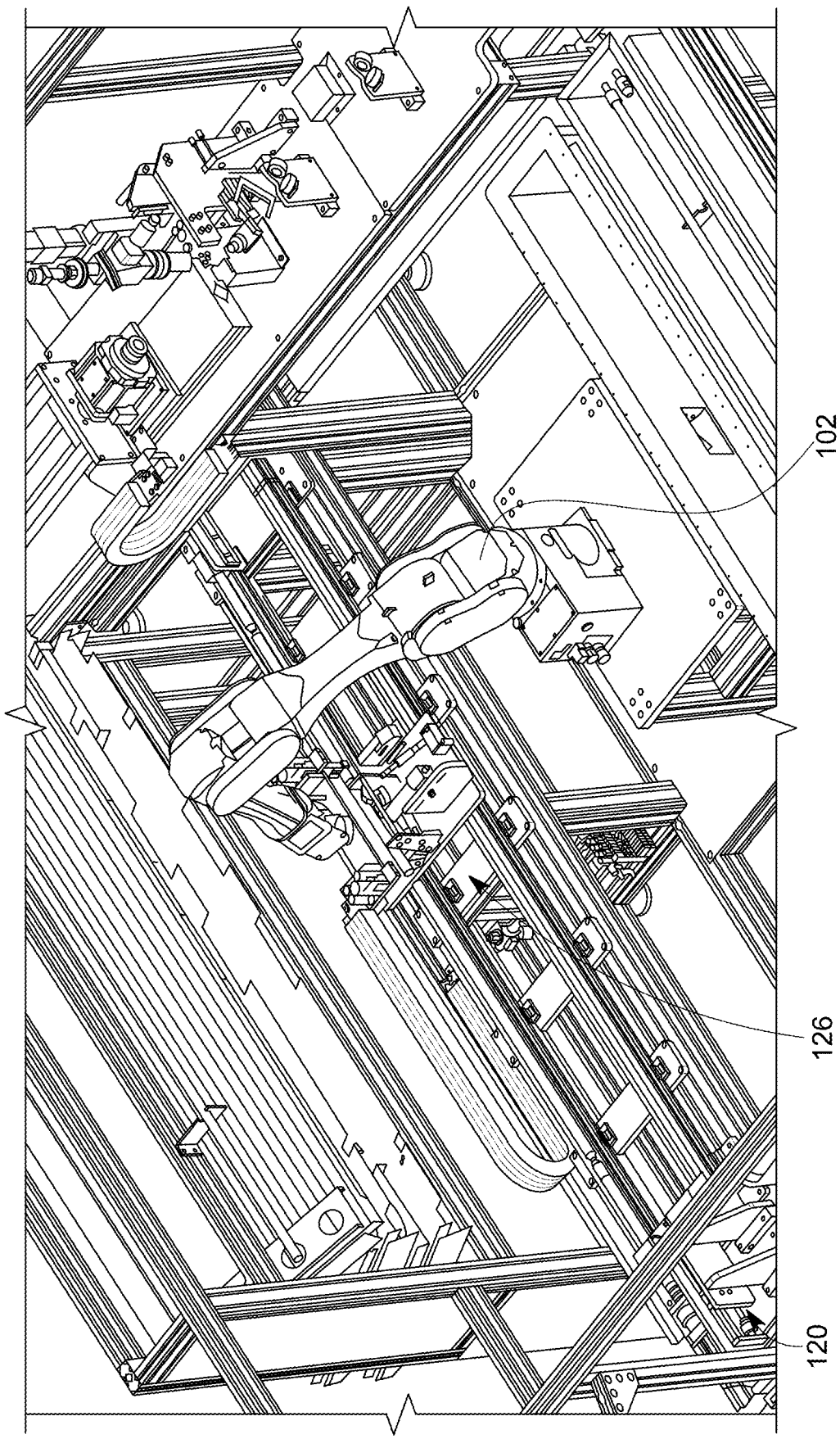

FIGS. 2A-2B and 16 show an exemplary layout concept for the production system 100, in accordance with an embodiment, as shown in the schematic drawing of FIG. 1A. While the description below may include specific reference to the system 100 and subsystems of FIGS. 2A-2B (and thus FIG. 1A), it should be understood that the systems and subsystems depicted in FIGS. 1B, 1C, and 1D may include similar or the same features and characteristics as described with reference to FIGS. 1A, 2A-2B, and 3-23.

FIG. 2A shows a top view of the subsystems of the production system 100 that are provided within a space. In one embodiment, better seen in FIG. 16, the system 100 comprises a frame 103 with walls or exterior guarding that forms a housing that is configured to substantially contain the subsystems or stations within a partially enclosed space. In another embodiment, the frame 103 may not be provided. The space or housing has a length L, width, W, and height H, and is positioned on a floor F.

In an embodiment, the layout within the system may include an access area and/or walkway along a floor F for an operator or a technician to access the parts or subsystems of the system to perform work. For example, an operator, a technician, or a worker may access the system 100 to perform maintenance, modifications, and/or repair work, as needed, to parts provided in the subsystems. The system may include a doorway and/or a hinged door on one of its sides, e.g., a front side, for access into the housing and to the system. In an embodiment, an access door 104 (see FIG. 16) is positioned on a front part of the frame 103 to provide access to the robotic arm 102 and subsystems therein. The location of the doorway or access door 104 may be altered, and may, e.g., be dependent upon the placement of the subsystems.

The production system 100 may include a workstation 106 and a number of other stations 108, 110, positioned adjacent to and on the outside of the space/frame 103 thereof. For example, the workstation 106 and/or stations 108, 110 may provide a workspace for an operator that includes display screens, input devices, controllers, computers, and the like for monitoring the performance of, and controlling, the production system 100. For example, the workstation 108 and/or stations 108, 110 may include one or more computers or controllers 118 that control various parts of the system 100. In an embodiment where a computer is used, the computer may be a general purpose computer or a special purpose computer. To implement the various parts and their functionalities as described herein, computer hardware and software platforms may be used. The computer may include a central processing unit in the form of one or more processor, for executing program instructions. The computer or controller may include a program programmed or saved therein that is designed to direct the robotic arm 102 and each of the devices in the subsystems, for example. Data storage in the form of tangible, non-transitory media, such as memory (RAM or ROM), may be provided, along with a communication bus, in the computer or controller. The method for processing the tubes as disclosed herein may be stored on storage media associated with the computer or controller. Tangible non-transitory storage type media include any or all of the memory or other storage for the computer, processor(s) or the like of the herein described system components, or associated modules thereof, which may provide storage for the software programming.

In accordance with an embodiment, the system includes a six-axis (6-axis) robotic arm 102 configured to pick and grasp and move each tube being processed between multiple sub-systems. As generally understood by those of skill in the robotic and/or automation arts, a six-axis robotic arm is designed to operate on six axes, i.e., operate by moving back and forth (backwards and forwards), up and down, and side to side. Generally, such a robotic arm comprises multiple arms, joint bearings, an end effector, a structural frame, controller(s), and multiple servo motors, for moving the parts in the different directions as directed by a controller associated therewith. The end effector acts as the grasping mechanism or hand for grasping and picking up each tube to move it between the subsystems. Since such robotic arms are generally known in the art, its features are not described here in detail.

In one embodiment, the multiple subsystems may include: a tube input-output subsystem 120—also referred to as a "tube containment unit" herein—that is configured to hold a plurality of tubes, an inspection system 122, a laser cutting subsystem 128, and an optional post-processing subsystem 130 each of which are shown and described in greater detail with reference to FIGS. 4-15. By automating the production and inspection process using the robotic arm 102 and layout of the subsystems, the herein disclosed production system 100 and its method steps provides a higher quality product and greater accuracy in producing filtration tubes that are consistent and satisfactory for customers. The disclosed system reduces and/or minimizes operator interaction, e.g., due to automation of the process, which, in turn, reduces operational costs as well as provides other advantages which are further evident based on the description below.

Use of the term "system" and "subsystem" when referring to devices shown in FIGS. 4-15 may be used interchangeably throughout this application. The term subsystem is simply meant to refer to a system that is provided as part of the overall production system 100. Further, the subsystems as shown herein are exemplary and not intended to be limiting. That is, other systems may be included as part of the production system 100 and/or the herein described systems may be removed from the overall system 100 (e.g., such as shown in FIGS. 1B, 1C, and/or 1D).

In the illustrated embodiment of FIG. 2A, the six-axis robotic arm 102 is provided near or in a center of the space (e.g., within or without frame 103) with a tube input-output subsystem 120 and inspection systems 124, 126 to the left of the robotic arm 102, the post-processing system 130 to the right of the robotic arm 102, and the laser cutting system 128 provided and incorporated into the system at its back (see also FIG. 2B, showing the exemplary placement sub-systems in the system without frame 103 for illustrative purposes only). In another embodiment, the location of the stations may be altered. In another embodiment, the inspection system 122 is positioned to the right of the robotic arm, and the tube input-output system 120 is positioned at the front of the system 100. Accordingly, it should be understood that the layout of the sub-systems as shown in the Figures is exemplary and not intended to be limiting.

The general functions of these parts of the production system 100 are as follows: the robotic arm 102 is configured to withdraw a tube for processing from the tube containment unit or input-output subsystem 120 and move each tube between the above-noted sub-systems. In one embodiment, each subsystem is designed to complete its function in approximately one hour or less, and without holding up production for the laser cutting system 128. The inspection system 122 (e.g., including a pre-inspection system 124 and a post-inspection system 126) is configured to receive and inspect each tube withdrawn by the robotic arm 102 from the tube input-output subsystem 120. In this disclosure, "unprocessed tubes" refers to tubes before slots, holes, and/or pores are cut or formed in the tube by the laser system. "Pre-inspection" of each tube includes inspecting the unprocessed tubes. In accordance with an embodiment, the pre-inspection system 124 is configured to inspect each unprocessed tube by scanning a surface of each tube to determine presence of abnormalities in dimensions and/or defects in said tube and to determine each tube without said abnormalities and/or defects that has passed pre-inspection. The laser cutting system 128 is configured to receive each tube that has passed pre-inspection via the robotic arm 102 moving said tube from the pre-inspection system 124 to the laser cutting system 128. The laser cutting system 128 is configured to cut a plurality of slots, holes and/or pores into and through a wall of each tube to form a filtration tube that is configured to filter solids from fluids. The post-processing system 130 processes each tube cut by the laser cutting system 128, i.e., processes the tube after it is cut or slotted. The post-inspection system 126 is configured to receive and inspect each tube collected by the robotic arm 102 from the post-processing system 130. In this disclosure, "processed tubes" (or slotted tubes, or cut tubes) refers to tubes after slots, holes, and/or pores are cut or formed in the tube by the laser system. "Post-processing" of tubes may include, for example, cleaning, rinsing, drying, and/or inspecting of tubes after the tube is cut using the laser system. "Post-inspection" of processed tubes includes inspecting the each of the processed or slotted tubes. In accordance with an embodiment, the post-inspection system 126 is configured to inspect each processed tube by scanning the surface of each tube to determine, at least, slot/hole quality and porosity of each tube after being cut by the laser cutting system 128, and to determine each tube that has passed post-inspection. Post-inspection may take place after laser cutting by the laser cutting system, or after processing by a post-processing system. "Filtration tubes" as described herein refers to tubes that are processed and have passed post-inspection (and pre-inspection) and thus are configured for use as filters. These finished filtrations tubes have been cut and inspected, and are ready for shipping to a customer and/or manufacturer, for example.

As further explained below, the pre-inspection system 124 and post-inspection system 126 may be part of, or contained into, one inspection subsystem 122 (or station). Further, each of the sub-systems may be provided with or on a separate, structural frame and/or table that allows for movement and placement of each sub-system within the space/frame 103 on the floor F.

Figure 3:
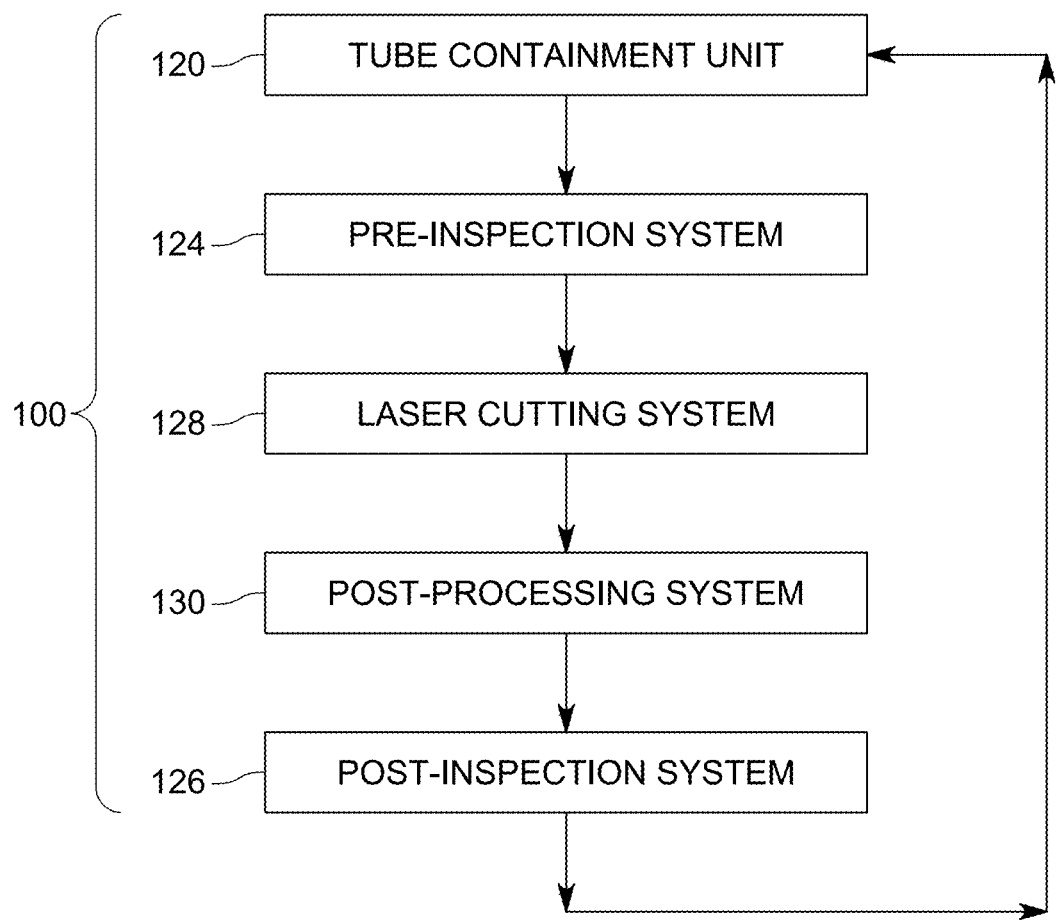
FIG. 3 is a schematic flow chart depicting an exemplary method of moving each tube through each sub-system of FIGS. 2A-2B.

A method of using the herein disclosed production system is generally illustrated in the schematic drawing of FIG. 3 and also shown in greater detail with reference to FIGS. 16-23. For example, in an embodiment, the method includes, for each tube: withdrawing a tube for processing from the tube containment unit or tube input-output subsystem 120 using the robotic arm 102 (see, e.g., FIG. 16), moving the tube to the pre-inspection system 124 (or inspection subsystem 122) for inspection using the robotic arm 102 (see, e.g., FIG. 17); inspecting the tube by scanning a surface of the tube using the pre-inspection system 124 to determine presence of abnormalities in dimensions and/or defects and/or quality issues in said tube and to determine each tube without said abnormalities and/or defects and/or quality issues that has passed pre-inspection or that is defective; and, upon passing pre-inspection, moving the pre-inspected tube to the laser cutting system 128 using the robotic arm 102, or, else, moving a defective tube (i.e., a tube determined as having abnormalities and/or defects and/or quality issues) back to the tube input-output subsystem 120 using the robotic arm 102. For each tube passing inspection, the method further includes cutting a plurality of slots, holes and/or pores into and through a wall of each tube to form a filtration tube that is configured to filter solids from fluids using the laser cutting system 128 (see, e.g., FIG. 18). Optionally, when a system 100 includes a post-processing system 130 such as shown in FIGS. 2A-2B, the method further includes moving the cut tube from the laser cutting system into the post-processing system 130 using the robotic arm 102; and processing the tube cut by the laser cutting system 128 using the post-processing system 130 (see, e.g., FIGS. 19-21, which are further described below). The method includes moving the cut tube from laser cutting system 128, or alternatively from the post-processing system 130 (if it is included), to the post-inspection system 126 (or inspection subsystem 122) using the robotic arm 102 (see, e.g., FIG. 22); and inspecting the tube using the post-inspection system 126 by scanning the surface of each tube to determine at least slot/hole quality and porosity of each tube after being cut by the laser cutting system and to determine each tube that has passed post-inspection. Depending on the outcome of the post-inspection, the robotic arm 102 is configured to move each tube from the post-inspection system to the tube input-output subsystem 120 and place the tube in the appropriate or particular bin or tray based on whether or not it passes inspection (see, e.g., FIG. 23).

Further method steps relating to using each of the sub-systems are also described below.

Tube Input-Output Subsystem

Figure 4:
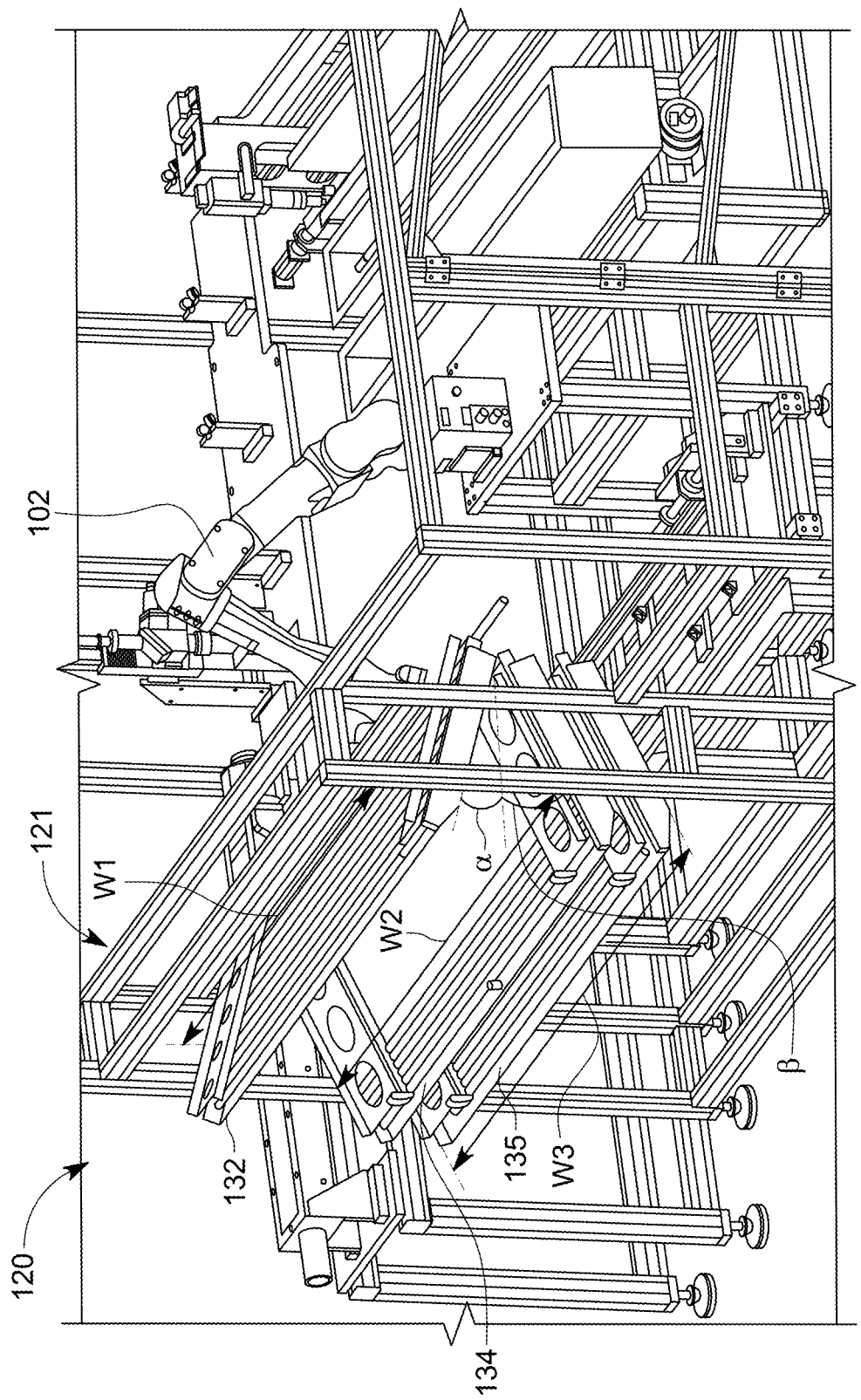
FIG. 4 is an angled side view of a tube input-output subsystem of the production system of FIGS. 2A-2B in accordance with an embodiment.

Turning now to FIGS. 4-15, exemplary features of each of the sub-systems are herein described. Specifically, FIG. 4 shows features of the tube input-output subsystem 120 which is used to load tubes for inspection, laser cutting, and post-processing (e.g., cleaning), as well as to outfeed laser cut tubes after processing. The input-output subsystem 120 may include a structural frame 121 for positioning the subsystem 120 near the robotic arm 102, e.g., to a left side of the space/frame 103. The structural frame 121 may be partially or mostly contained within the frame 103 and its guarding, for example. Generally, the input-output subsystem 120 may include a first (e.g., left or outer) side that is accessible to an operator, e.g., through the frame 103 or housing (see FIG. 2A), and a second, opposite side (e.g., right or inner side) that is accessible by the robotic arm 102, e.g., when robotic arm 102 is placed in a central location or near a center of the space/frame 103/housing. In one embodiment, unprocessed tubes are fed into the input-output subsystem 120 on the first (e.g., left or outer) side, while the second, opposite side (e.g., right or inner side) receives the unprocessed tubes and provides access to the tubes such that the robotic arm 102 may grasp and remove each tube therefrom. The processed tubes may be fed into the input-output subsystem 120 by the robotic arm 102 on the second side (e.g., right or inner side), and removed by the operator from the first side.

In an embodiment, such as shown in FIG. 4, the tube input-output subsystem 120 holds tubes that are unprocessed and uninspected, tubes that have failed inspection as a result of inspection via the pre-inspection system 124 or the post-inspection system 126, and tubes that have passed inspection and are configured for use as filtration tubes. In one embodiment, the input-output subsystem 120 may have a first or top tray 132, a second or middle tray 134, and a third or bottom tray 136. In an embodiment, the top tray 132 may hold the unprocessed and uninspected tubes, the middle tray 134 may hold any tubes that have failed inspection by either subsystem 124 or 126, and the bottom tray 136 may hold tubes that have passed inspection and are configured for use as filtration tubes. The unprocessed tubes may be loaded by an operator or technician, for example, into the top tray 132 on the first/left side, and processed tubes may be unloaded from the bottom tray 136 on the same side. Use of the word tray is not intended to be structurally limiting; for example, each of the trays may also be referred to herein as a "bin" for holding multiple tubes.

Figure 5:
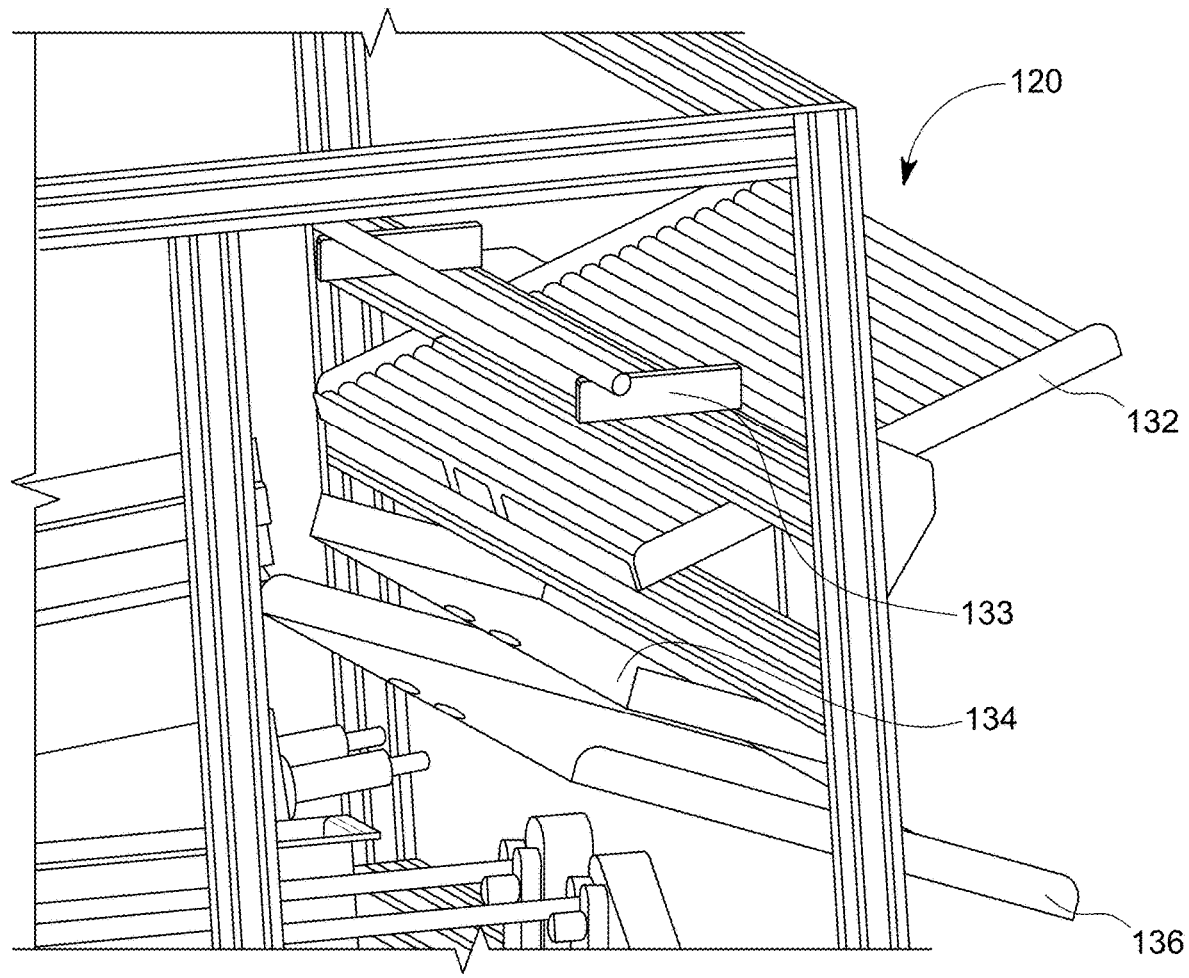
FIG. 5 is an alternate view of the tube input-output subsystem of FIG. 4.

In the illustrated embodiment, each tray 132, 134, and 136 may include a receiving surface that has a width W1, W2, and W3, respectively, for receiving and aligning the tubes in a substantially longitudinal or horizontal manner therein. FIG. 5 shows an alternate view of the trays 132, 134, and 136 and some of the exemplary parts associated with the tube input-output subsystem 120. In an embodiment, each tray 132, 134, and 136 may have a receiving slot at a first end (e.g., left end) and/or a second end for receiving tubes, such that they may be guided along a length of the surface of the tray between its ends. One or more stoppers or ledges may also be provided at first and second ends of the tray to assist in limiting movement of the tubes received therein beyond the ends of the tray. In one embodiment, each tray 132, 134, and 136 is configured for locking at a non-zero angle relative to a horizontal plane, e.g., a plane that extends across the floor F upon which the production system 100 is placed. For example, in one embodiment, the top tray is configured at an upwardly extending, acute angle α relative to the horizontal plane of the floor F. This allows any unprocessed tubes inserted at the first end of the tray 132 to move and gather at the second end for access by the robotic arm 102. In an embodiment, the second and third trays are configured at a downwardly extending angle (3 relative to the horizontal plane of the floor F. This allows failed tubes and processed tubes inserted at the second ends of the trays 134, 136 to move and gather at the first ends thereof, for access and removal by the operator. In an embodiment, any of the trays 132, 134, and/or 136 may have a hinge for hingedly connecting the tray to the structural frame 121 and thus allowing for adjustment and altering of the angular position of the tray(s) 132, 134, and/or 136. Further, one or more of the tray(s) 132, 134, and 136 may have a lock or locking system associated therewith. For example, when loading unprocessed tubes into the top tray 132, the operator may wish to first position the tray 132 at a downward angle (e.g., like angle β) to add tubes into the tray 132 at its first end, and thereafter move the tray 132 into its upwardly extending angle α such that the tubes are moved along its width to the second end. The type of lock or locking system used to secure the tray(s) is not intended to be limiting. For example, the lock may include a bracket with slot(s) therein (e.g., provided on the frame 121) for receipt of a clip therein, or a separate device that secures the tray(s) at a desired angle.

Also shown in FIG. 5 is an optional extra staging location 133 that may be included in the tube input-output system 120. This extra staging location 133 may be a frame that includes slots for holding a next tube to be processed, for example. The frame may be positioned adjacent to, above, or near the first tray 132.

Inspection Subsystem

Figure 6:
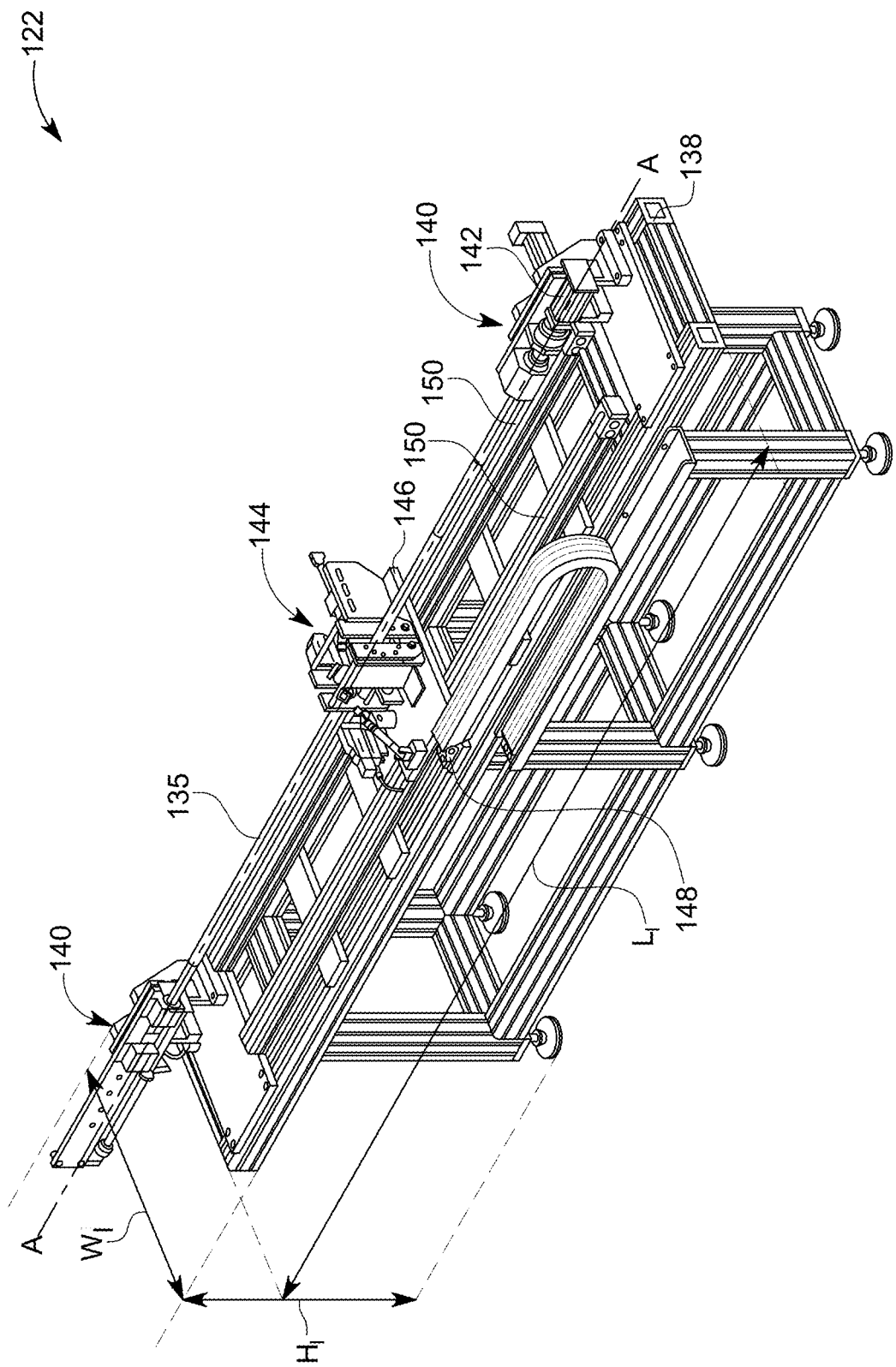
FIG. 6 is an isometric view of an inspection system, including a pre-inspection system and post-inspection system, of the production system of FIGS. 2A-2B in accordance with an embodiment.

FIG. 6 shows an overview of the inspection subsystem 122, in accordance with an embodiment. As previously noted, in this exemplary illustrated embodiment, the pre-inspection subsystem 124 and post-inspection subsystem 126 may be provided together, e.g., both mounted relative to the same structural frame 138. Accordingly, the inspection system 122 may serve two purposes—first, pre-inspection of unprocessed tubes, and second, post-inspection of processed tubes, after they have been cut or slotted and post-processed (e.g., cleaned and/or rinsed and/or dried). The frame 138 positions the inspection subsystem 122 near the robotic arm 102, e.g., towards a side or left of the space/frame 103. The frame 138 may be partially or mostly contained within the frame 103 and its guarding, for example. The system 122 may be defined in a space, e.g., having a length $L_I$, width $W_I$, and height $H_I$.

Figure 7:
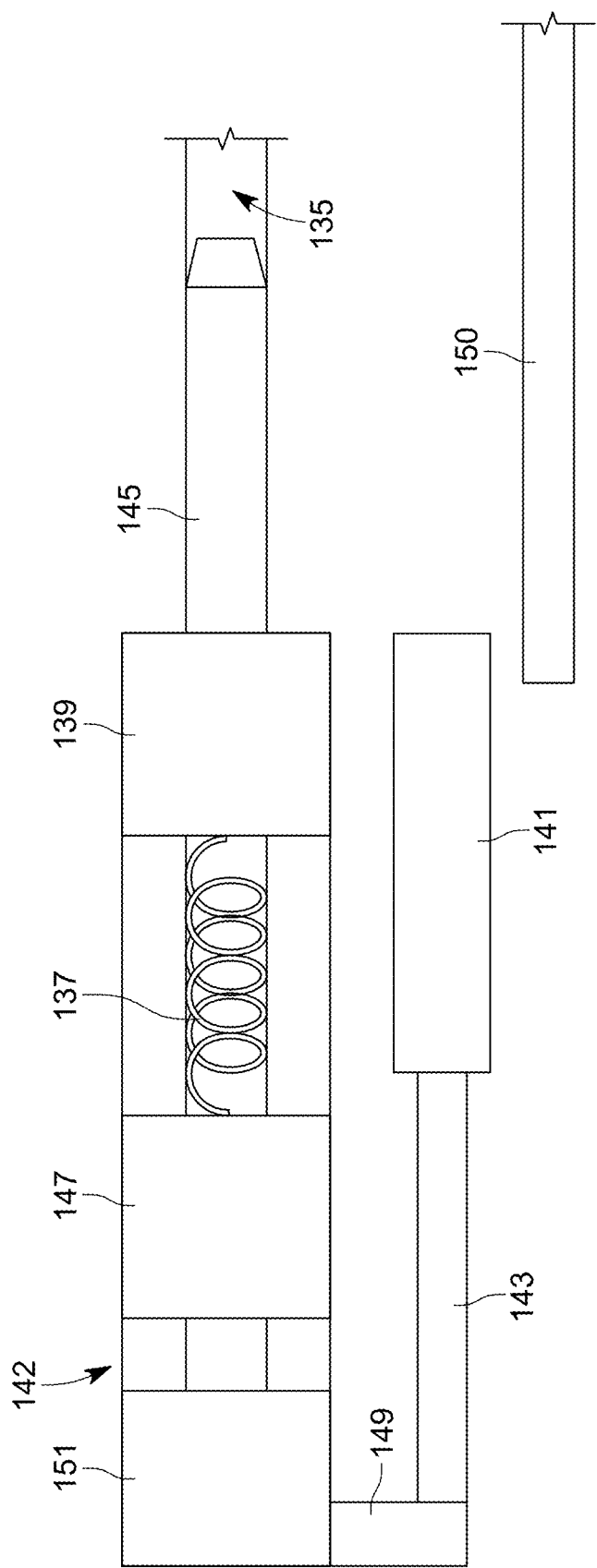
FIG. 7 is a side view schematically depicting features of the inspection system of FIG. 6.
Figure 8:
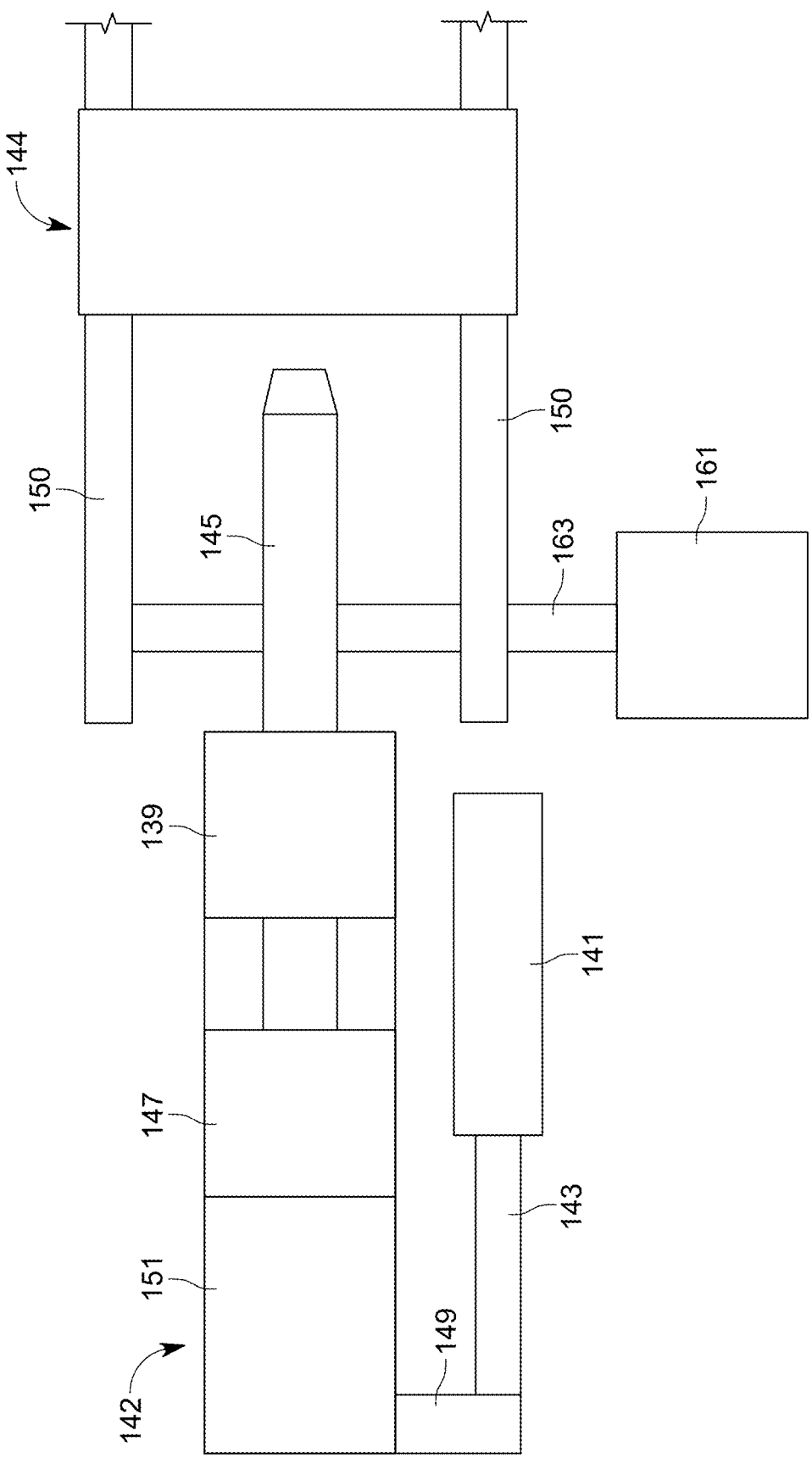
FIG. 8 is a top view schematically depicting features of the inspection system of FIG. 6.

The frame 138 generally extends in a horizontal direction and may include one or more securement devices 140, e.g., at either longitudinal end of a tube, to secure each tube (e.g., tube 135, shown here for illustrative purposes) before and after cutting for inspection by one or more inspection devices. In an embodiment, such as schematically depicted in FIGS. 7 and 8, each securement device 140 includes a spring-loaded rod including a tube gripper rod 145 that is spring-loaded via compression spring 137. This spring-loaded rod may be used to hold and support the tube (135) being inspected. In one embodiment, the rod is configured to hold and support the tube being inspected via or from the inside diameter of the tube. Further, in an embodiment, at least one of the securement devices 140 includes a rotation device 142, e.g., servo-motor 147, associated therewith for rotating each tube mounted therein relative to the inspection devices along a longitudinal or horizontal axis A-A. In an embodiment, each securement device 140 includes rotation device 142. The spring-loaded rod may be supported by two bearings 139 and 147, for example, and further supported by a base plate 151. Using device 142, the spring-loaded rod may be configured to move axially for the spring-loaded support and radially so it may rotate with the tube 135 while the tube is being inspected. The bearings used in the devices 140 of subsystem 122 may include both linear motion bearings and/or rotary bearings. In one embodiment, the securement device(s) 140 are controlled by a pneumatic piston actuator 141 and pneumatic piston rod 143 that are connected to the base plate 142 via connector 149, enabling the spring-loaded rod to be pressed against a tube (135) in order to hold it in place while being inspected. The piston actuator 141 may be used to hold and release the tube 135 during the inspection processing. In an embodiment, when the piston actuator 141 is fully extended, the device is considered open and the tube can be removed. When the piston actuator 141 is retracted, the device is considered closed and the tube is locked in position. When in the closed position, the spring 137 compresses the rod 145 to the tube 135 which firmly holds it in place.

The inspection devices 124, 126, generally represented as 144 in FIGS. 6 and 7, are shown mounted on a tray 146 (see FIG. 10) that is positioned on the frame 138. Each inspection device 124, 126 may be controlled for movement along rails 150 via a linear guide rail motor 161 (see FIG. 8) which is driven by a linear guide rail drive shaft 163. This may control the inspection device 144 in a manner such that they move linearly forwards and backwards (along axis A-A) when inspecting the tube 135. As shown and discussed with reference to FIGS. 9 and 10, the inspection device 144 may contain a laser caliper/micrometer 124 for the pre-inspection of the tube and a vision inspection camera 166 for the post-inspection of the tube, in accordance with one embodiment.

The tube 135 held in place by the tube gripper rod 145 and spring 137 on each end of the tube. As discussed above, the tube gripper rod 145 may rotate the tube 135 during inspection via the motor 147 and the rotary bearing 139. The pneumatic piston actuator 141 allows for the repositioning of the motor/rotary bearing base plate. As the length of tube is different for pre-inspection and post-inspection, this piston actuator allows for a change in the position of the stage or tray 146.

Figure 9:
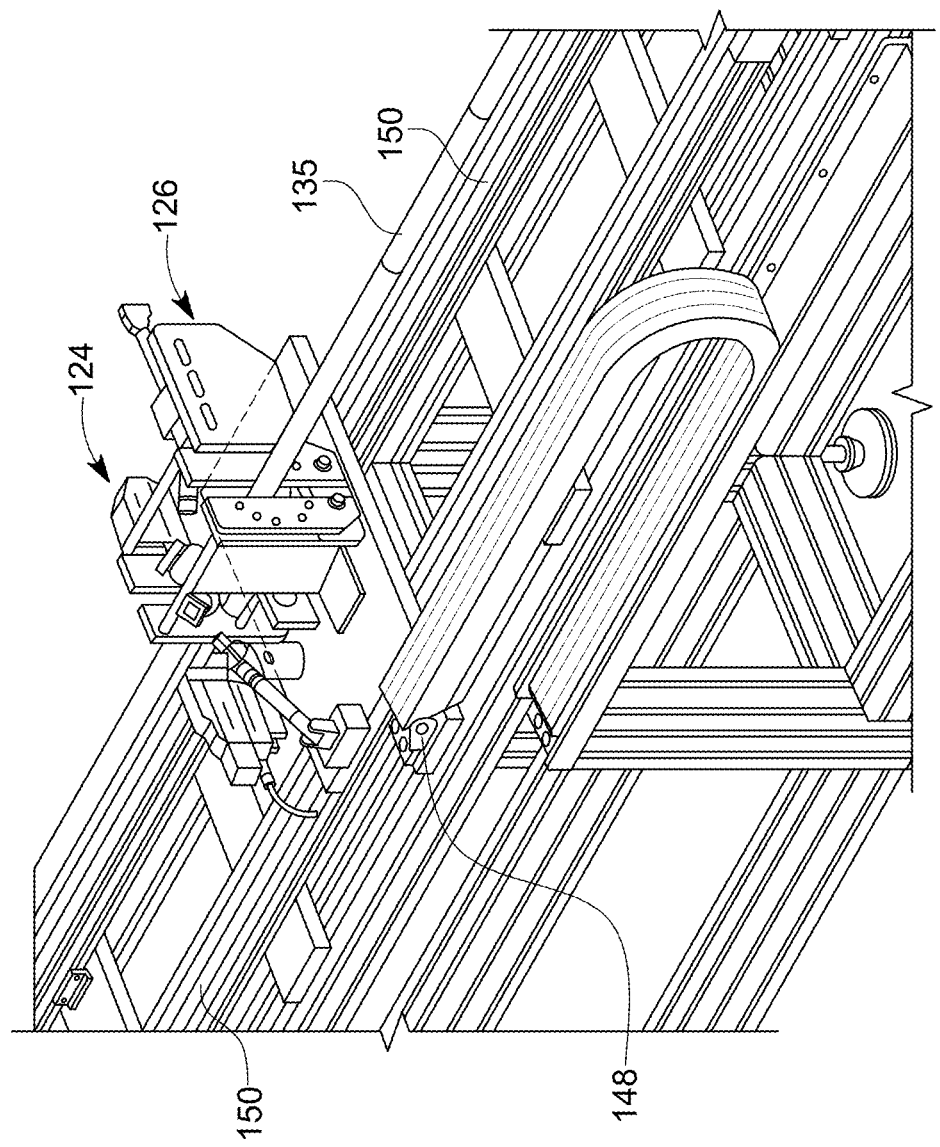
FIG. 9 is a detailed view of parts of the inspection system of FIG. 6.
Figure 10:
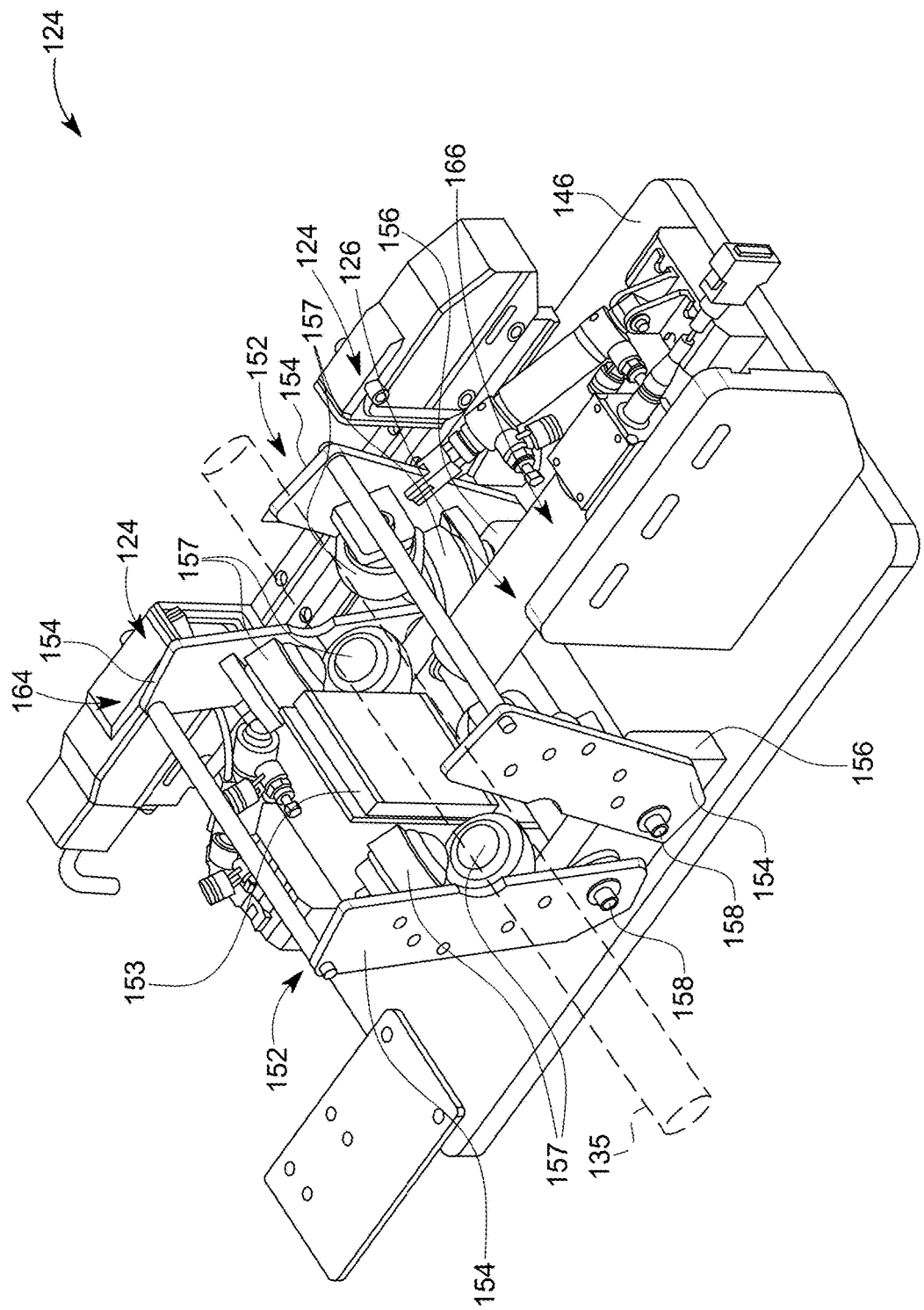
FIG. 10 is an overhead and angled view of the parts of FIG. 9 that may be included in the pre-inspection and post-inspection systems, in accordance with an embodiment.

FIGS. 9 and 10 show more detailed views of exemplary inspection devices 144 associated with the pre-inspection and post-inspection subsystems 124, 126, in accordance with an embodiment. The subsystems 124, 126 mounted on the tray 146 along with guide brackets 152. Guide brackets 152 include guide plates 154 that may be pivotally mounted via hinge connections 158 or hinged rods to blocks 156 secured to a top of the tray 146. Each guide plate 154 may include a rounded, cut-out portion 160 that complements and/or may be slightly larger than a diameter of tube 135. The brackets 152 may also including a number of bearings 157 designed for placement against a surface of the tube 135 for guidance and securement of the tube. In one embodiment, eight bearings 157 are provided. The bearings 157 are designed to pivot with the brackets 152 into and out of contact with the tube 135. Pneumatic arms 162 (e.g., pistons) may also be mounted to the tray 146 to move the guide brackets 152 towards and away from the secured tube 135. The brackets 152 may be moved between the open and closed/securement positions via the pneumatics, e.g., positive air pressure may be used to move the brackets 152 towards each other for locking into a closed position around a tube, while releasing air allows the brackets 152 to move away from each other to an open position for releasing the tube. FIG. 10, for example, shows the guide brackets 152 in an open position away from the tube. Once a tube is secured in the laser cutting system 128 using the securement devices 140, the arms 162 may be activated to move or pivot the guide brackets 152 about their hinge connections 158 such that the cut-out portions substantially surround the tube 135, such as shown in FIG. 9. The tray 146, and thus each of the subsystems 124, 126, may then be configured to move horizontally along the longitudinal axis A-A relative to the secured tube 135 to inspect and scan the surface of the tube as it is rotated by the rotation device 142 using linear slides 148 (one side being shown in FIG. 6) and a motion control system that are mounted to the frame 138. In an embodiment, the motion control system includes a separate motor for moving the slides 148 and tray 146 along a pair of parallel, linear guide/tracking rails 150 that are provided or mounted to a top of the frame 138.

In accordance with an embodiment, the tube (135) to be inspected may be placed such that its ends are between two support rods of the securement devices 140. A pneumatic piston actuator on either or each of the devices 140 is controlled in order to lock and/or release the tube. In one embodiment, one of the support rods may be rotated by the rotation device 142 (servo-motor), while the other support rod is spring-loaded. The above-described hardware (e.g., tray 146, subsystems) is configured to move axially relative to the tube and linearly along the rails 150 of frame 138 during the inspection process(es) and powered by the servo-motor. Accordingly, two servo motors and two pneumatic piston actuators may be used as part of the motion control of the inspection system 122.

Although not explicitly shown in the Figures, a similar linear slide 148 such as the slide illustrated in FIGS. 6-9 may be provided on an opposite side of the tray 146 for movement along the rail 150.

The pre-inspection system 124 of the inspection system 122 is designed to inspect incoming tubes for quality control before moving to the next stage of the operation, e.g., the laser cutting machine/system. All tubes may be inspected for diameter and roundness before slots, holes, and/or pores are cut on/in any tube. Tubes should be within predefined specifications for cutting to be successful. If the tubing is found to be out of the specified tolerance, the tube will be rejected and discarded to a reject bin. If the tubing is found to be within the specified tolerance, the tube will be permitted to move to the laser cutting machine and the operation continues.

In one embodiment, the pre-inspection system 124 comprises a laser optical micrometer 164 for scanning the surface of each unprocessed tube. FIG. 10 shows parts of an exemplary laser optical micrometer 164 in greater detail. The laser optical micrometer 164 may be designed to measure tube diameter, roundness, and straightness, as well as defects in the tube surface, prior to laser cutting. This pre-inspection prevents any out-of-spec tubing from making its way to the laser cutting system 128, since the tube will not cut properly if it deviates too far from ideal and/or predetermined shape and dimensions. As generally understood by one of skill in the art, a laser optical micrometer includes a light source such as an LED, a condenser, a diffusion plate, an optical lens, and a sensor head. The laser optical micrometer uses a rotating optical element to scan a laser through a path and a receiver will detect the light that was unobstructed by the object to be measured. The object—in this case, the tube that is being inspected, or a feature on that tube—obstructs light from reaching the detector, thus giving a measurement of the object. The laser scans the tube surface to ensure the tube is within required specifications. According to one embodiment, the tube is rotated via the rotation device(s) 142 such that the diameter of the tube is measured and any imperfections or inconsistencies in the tube's diameter, roundness or straightness is detected.

Process boundaries for the laser optical micrometer 164 may be set by an operator, based on a design or dimensional range determined to be optimal or desirable, for example.

In accordance with an embodiment, other micrometers and/or gauges may be used, in addition or as an alternative to the laser optical micrometer, for the pre-inspection process. For example, in one embodiment, a machine vision system and/or camera for scanning a surface of each tube for inspection thereof, such as the camera described below with respect to the post-inspection system, may be used for pre-inspection.

During pre-inspection, as previously mentioned, tubes that pass inspection are sent onto the laser cutting subsystem 128 picking and moving them to the system via the robotic arm 102. Tubes that fail inspection are sent to the reject bin, e.g., the middle tray 134 of the tube input-output subsystem 120, by picking and moving them via the robotic arm 102.

In one embodiment, the post inspection system 126 comprises a machine vision inspection system including a camera 166 and backlight 153 for scanning the surface of each processed tube. FIG. 10 shows parts of an exemplary machine vision inspection system in greater detail. As previously described, the post-inspection subsystem 126 inspects tubes after they have been laser cut (and optionally post-processed via system 130). The post-inspection subsystem 126 verifies that a cut tube has met desired specification(s) after laser cutting, to ensure every tube meets the desired specifications. For example, the machine vision inspection measures the slot/hole dimensions and porosity of the tube. In one embodiment, the camera 166 is configured to scan the tube surface to ensure the tube is within required specifications. For example, the camera 166 may be used to check slot/hole quality and calculates porosity and average slot/hole width and length that have been cut into the tube via laser cutting system 128. The backlight 153 is used to assist in determining the quality of the slots, holes, and/or pores in the tube. For example, any void or slot in the tube may be viewed by the camera 166 as the backlight 153 is lit and shines through, and the porosity may be measured via the light shining through the slots, holes and/or pores (as compared to non-lighted areas) of the tube. Generally, this system is designed to inspect the quality of the cuts to ensure the specified cut geometry was achieved. The system may record the average length and width of each slot/hole/pore, and calculate the porosity of each finished tube, for example.

During post-inspection, if the tube does not meet the desired specification, the tube is rejected and an operator may optionally be notified, e.g., via workstation 106. Optionally, the rejected tube may be sent from the inspection subsystem 122 to the middle tray 134 of the tube input-output subsystem 120, by picking and moving them via the robotic arm 102. Tubes that pass inspection are sent to the finished tube holder, i.e., the bottom tray 136 of the tube input-output subsystem 120 via the robotic arm 102, where they may be packaged and prepared for shipping.

Process boundaries for the machine vision system may be set by an operator or customer, based on a design or dimensional range determined to be optimal or desirable, for example. In an embodiment, the inspection system boundaries may be based on the desired cuts to the tubes. The porosity, slot/hole length, and slot/hole width may vary and may be set based on customer requirements.

In an embodiment, the machine may be designed to laser cut and produce 1-1.64 meter lengths of micro-slotted tubes. In one embodiment, the post inspection system 126 is configured to measure a porosity range of the slots, holes and/or pores laser cut in tubes that is between approximately 1% and approximately 50% (both inclusive), a slot/hole/pore length in a range of approximately 0.1 mm and approximately 10 mm (both inclusive), and a slot/hole/pore width in range of approximately 1 micron and approximately 1000 micron (inclusive both). In another embodiment, the porosity range for production and inspection may be between approximately 5% to approximately 25%, with a slot length between approximately 0.5 mm to approximately 3.0 mm, and a slot width between approximately 10 microns to approximately 100 microns. In yet another embodiment, the system may be designed to produce micro-slotted tubes with a target porosity of 15%, in less than 1 hour. The tubes may include microslots or pores with approximate dimensions of approximately 30 micrometers to approximately 50 micrometers wide and approximately 1 mm long. The lengths of the tubes to be cut and processed in the system may vary.

The inspection subsystem 122 functions by moving both the optical micrometer 124 and machine vision camera/system (166) provided on the tray 146 along the rails and thus along length of the tube 135, while also rotating the tube via the rotation device 142, during either inspection step. This motion control strategy allows for full access to all outside areas of the tube for inspection. The length of the inspection subsystem 122 accommodates the length of the tube (which is approximately the size of the loading tray) before laser cutting, allowing the motion control system to have a range to accommodate the full length of the uncut tube for pre-inspection.

In accordance with an embodiment, a laser optical micrometer and/or vision system manufactured by Keyence Corporation may be implemented as part of the pre-inspection system 124 and/or post inspection system 126 of the inspection subsystem 122.

Laser Cutting Subsystem

Figure 11:
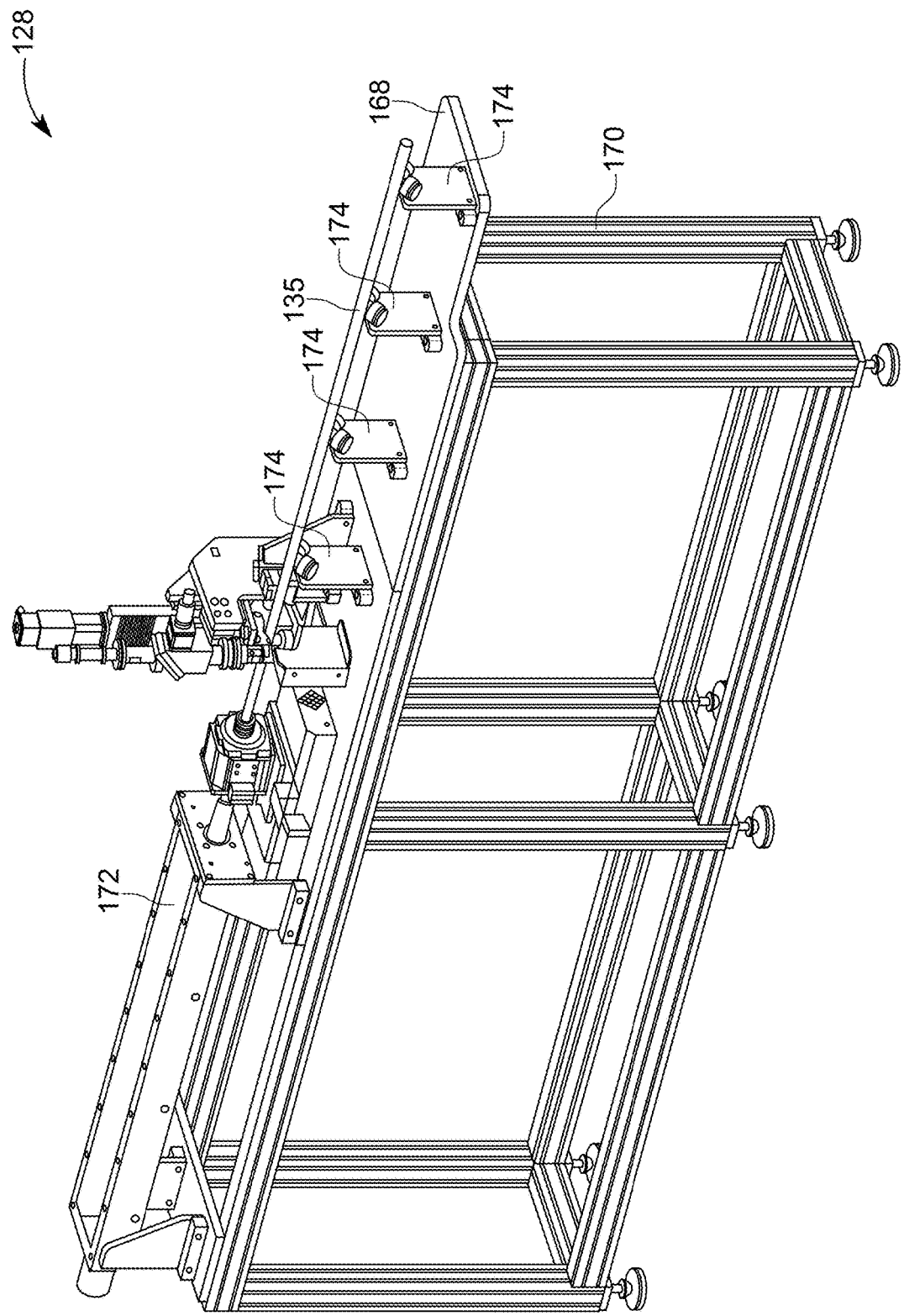
FIG. 11 is an isometric view of a laser cutting system of the production system of FIGS. 2A-2B in accordance with an embodiment.

FIG. 11 shows an overview of the laser cutting subsystem 128, in accordance with an embodiment. The laser cutting subsystem 128 is configured to cut micro slots, micro holes, and/or micro pores (also referred to herein and throughout this disclosure as simply "slots", "holes," and "pores", respectively) into tubes, thereby forming filtration tubes that are configured to filter solids from fluids when such material is filtered through those tubes. The laser cutter may be positioned on a table surface 168 mounted to a frame 170. The laser cutting subsystem 128 may be positioned near the robotic arm 102, e.g., towards a back of the space/frame 103, for example. However, the system 128 may be positioned in any number of places relative to the other subsystems. Further, as discussed with reference to FIGS. 1A-1E, any number of systems 128 may be included. The frame 170 and/or laser cutting system(s) 128 may be partially or mostly contained within the frame 103 and its guarding, for example.

In accordance with an embodiment, the laser subsystem 128 may be a laser system as described in co-pending U.S. Patent Application Ser. No. 62/738,853, titled "LASER CUTTING SYSTEM FOR CUTTING ARTICLES AND FORMING FILTRATION TUBES," filed on the same day, and assigned to the same assignee herein, which is hereby incorporated by reference in its entirety.

In an embodiment, the laser cutting subsystem 128 includes a delivery system for delivering a laser beam. The delivery system comprising a laser source configured to provide a laser beam, at least one mirror, a focusing objective lens, a gas source, and a delivery nozzle. The delivery nozzle may be configured to deliver gas from the gas source and the laser beam from the laser source towards the article to cut the plurality of slots, holes, and/or pores therein in a predetermined pattern along the article. A first stage may be provided for holding each article to be cut by the laser beam in a longitudinal direction and being configured to (a) rotate the article axially during delivery of the gas and laser beam towards the article and also (b) move the article longitudinally relative to the delivery nozzle as the laser beam is delivered to the article. A second stage may be provided for moving the delivery nozzle relative to the article being held by the first stage. A controller for controlling actuation of the laser beam and the gas source, and movement of the first stage and the second stage, may also be included in the laser cutting system 128. In an embodiment, the system 128 includes a first mirror and a second mirror, both configured for rotation via a rotatable mount for directing the laser beam. A camera for taking an image of the delivery nozzle and/or a relay lens for focusing the image may also be provided in system 128. System 128 may optionally include a monitoring device for measuring a rate of energy from the laser beam being used to cut the article and/or a coolant source and a coolant delivery nozzle to deliver coolant towards the article/tube as it is cut by the laser.

Figure 12:
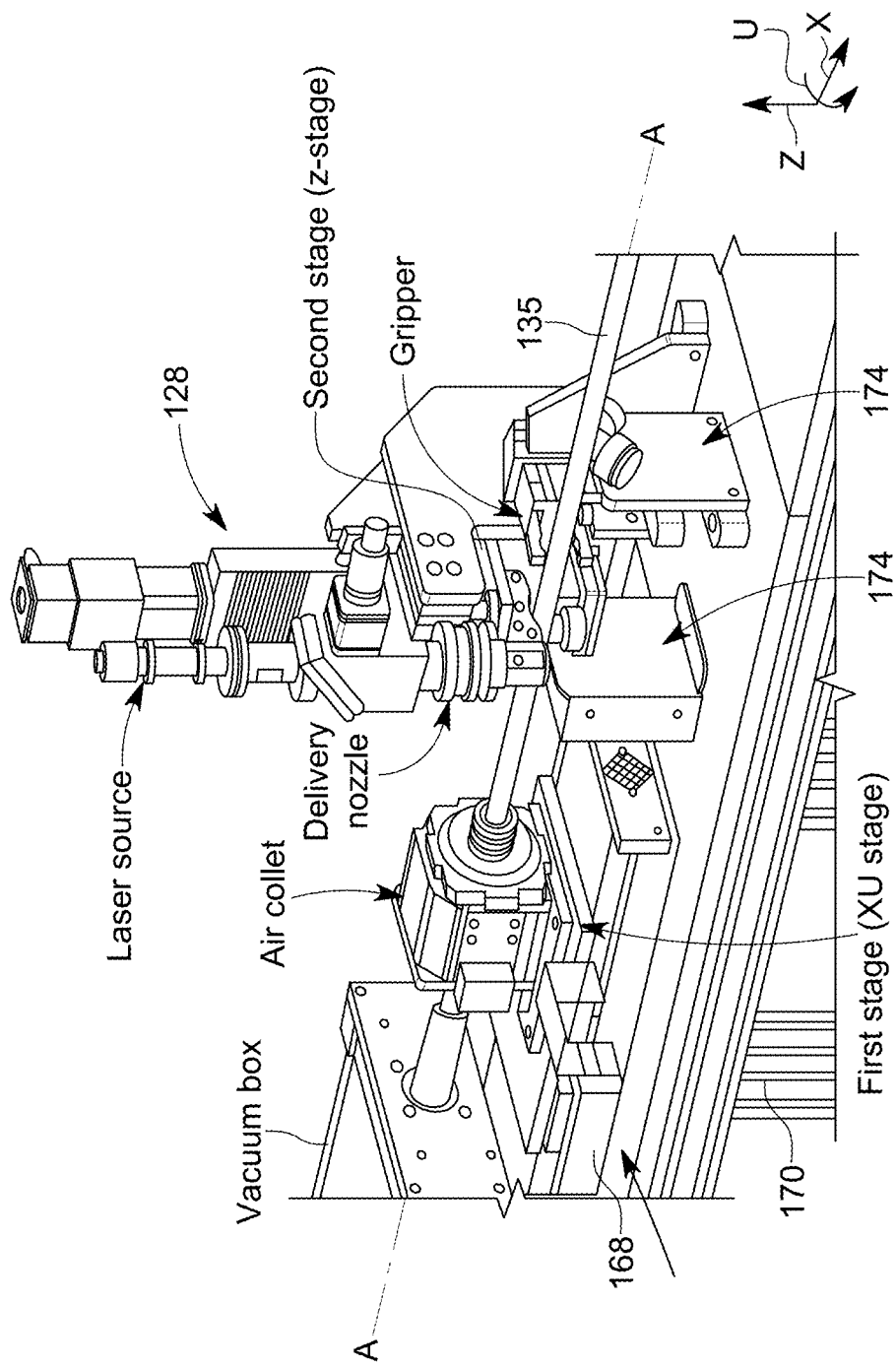
FIG. 12 is a detailed view of parts of the laser cutting system of FIG. 11.

FIG. 12 shows an illustrative example and assembly of features, in one embodiment, associated with the laser cutting system 128. Laser cutting system 128 may include a laser source configured to provide a laser beam and a delivery nozzle for delivering the laser beam towards the tube 135. A first stage holds each article in a longitudinal direction, and may rotate the article axially during delivery of the gas and laser beam towards the article and move the article longitudinally relative to the delivery nozzle. A second stage is provided in the system for moving the delivery nozzle relative to the article being held by the first stage. A controller controls actuation of the laser beam and the gas source, and movement of the first stage and the second stage. A motor, chuck, and/or air collet rotates the tube, and thus its surface, relative to the laser beam emitted by the laser source, for cutting the slots, holes, and/pores in the tube based on a desired pattern. A gripper may also assist in holding and guiding the tube as it is laser cut.

The laser cutting subsystem 128 may also include a vacuum box 172 and tube bearing supports 174. In the illustrated embodiment of FIG. 11, the vacuum box 172 is provided on the left side of the machine and table surface 168. In an alternative, the vacuum box 172 may be positioned on the right side, but with the ability to open and close when the robot arm loads and unloads the tube. Spaced along the table surface 168 are a number of tube bearing support brackets 174 that extend vertically upward from its horizontal surface. Each bearing support bracket 174 may include a set of omnidirectional transfer balls provided at an angle to support a surface of the tube and to guide the tube in the vicinity of the laser head. In an embodiment, at least some of the brackets 174 include balls that are angled towards each other. In another embodiment, the balls may be positioned substantially vertically to support the tube surface from below.

The vacuum box 172 includes a vacuum motor and, in one embodiment, a hose connected thereto. The connection size or diameter of the hose may be based on the desired amount of air flow down the tube. The hose connection or diameter between the vacuum motor of the vacuum box may be in the range of between approximately 30 mm to approximately 80 mm, inclusive. In one embodiment, the hose has a diameter of approximately 76 mm. Of course, such dimensions are exemplary and not intended to be limiting in any way.

Post-Processing Subsystem

Figure 13:
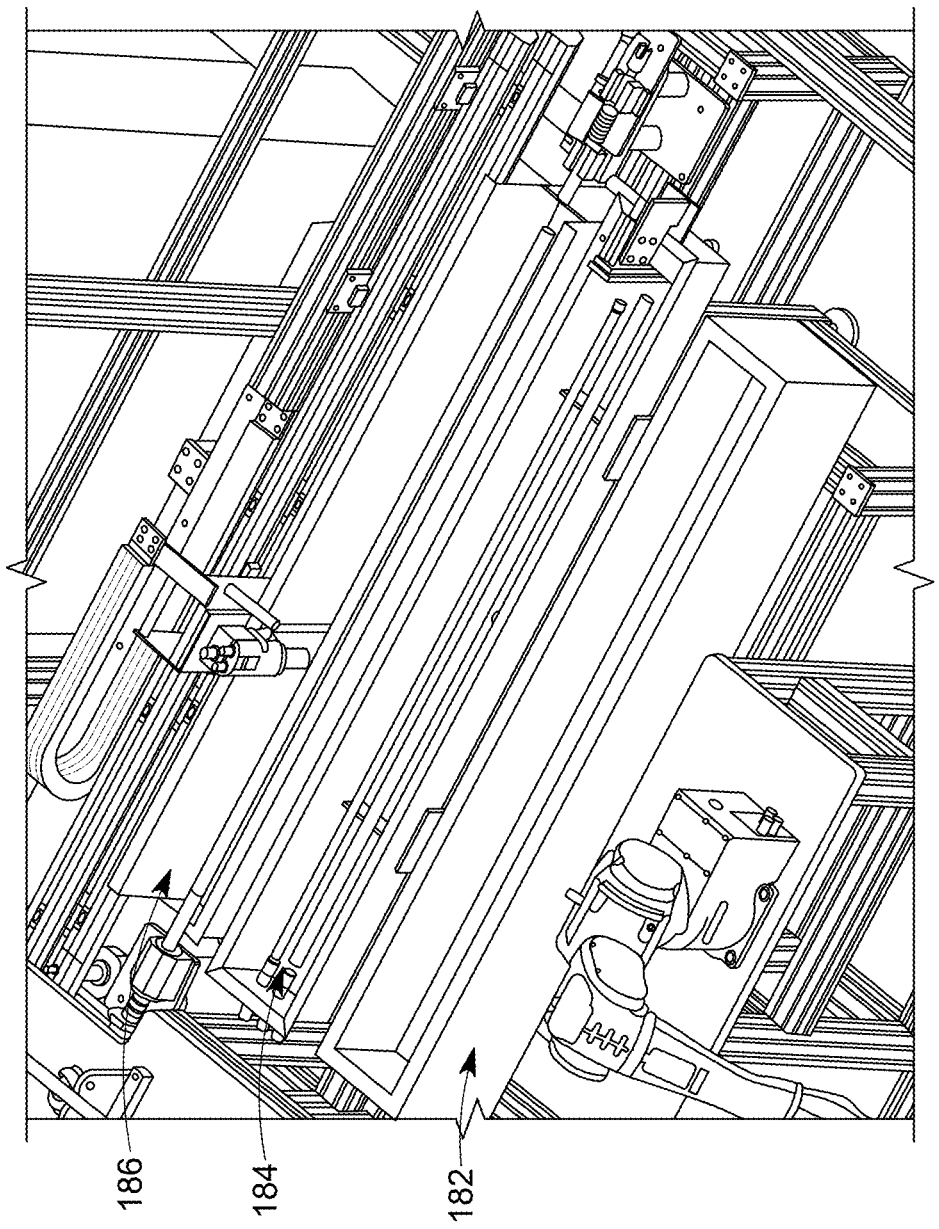
FIG. 13 is an overhead, angled view of the post-processing system of the production system of FIGS. 2A-2B in accordance with an embodiment.
Figure 14:
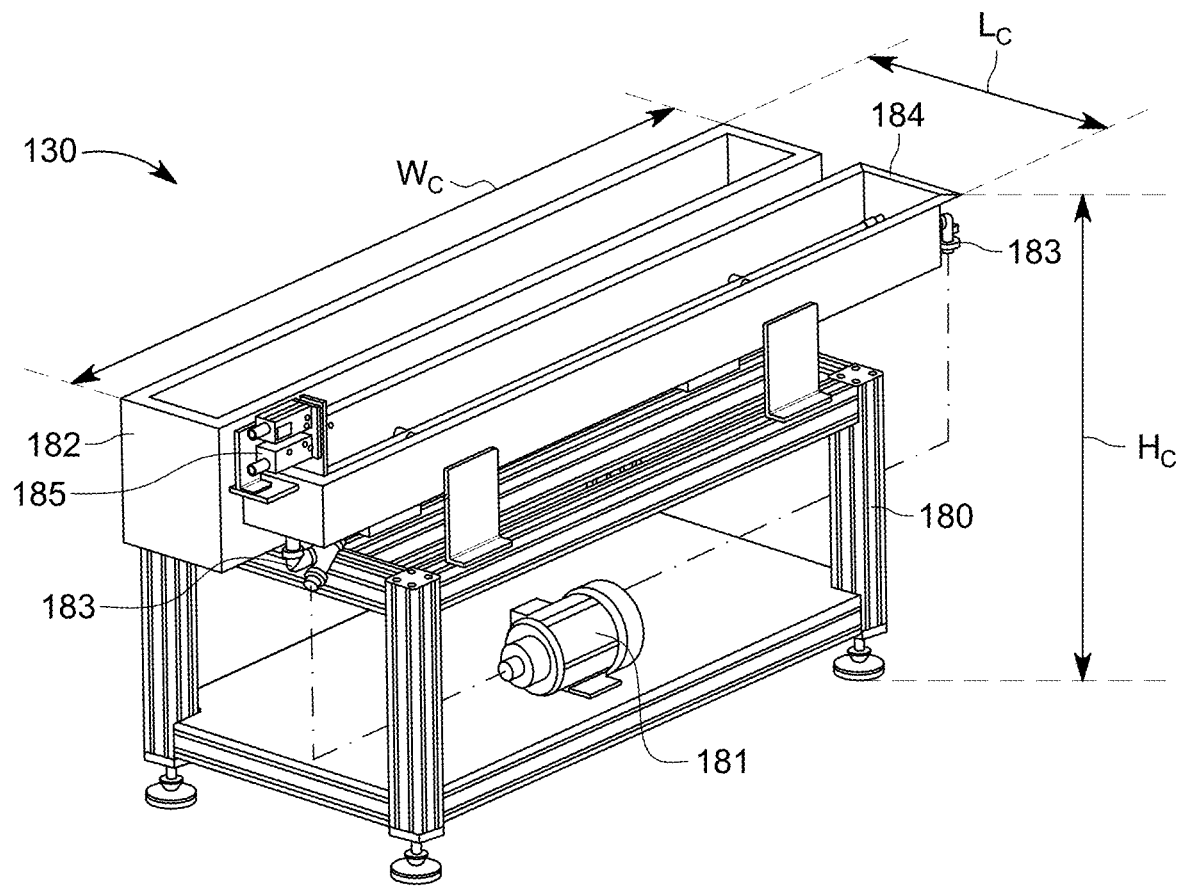
FIG. 14 is an angled view of an exemplary ultrasonic bath and rinsing system that are part of the post-processing system of FIG. 13 in accordance with an embodiment.

FIGS. 13-15 shows an overview of the optional post-processing subsystem 130, in accordance with an embodiment. Specifically, FIG. 13 shows features of the post-processing subsystem 130 which may process tubes after each tube is slotted/cut by the laser cutting subsystem 128 (and inspected in by the inspection subsystem 122). In one embodiment, the post-processing system 130 includes a cleaning system for cleaning cut tubes. Cleaning moves and removes any loose slag and particulate remaining inside and/or outside the tube as a result of the cutting process. The post-processing subsystem 130 may include a structural frame 180 (seen in FIG. 14) for positioning the parts thereof in which the robotic arm 102 may have access, e.g., to a right side of the space/frame 103. The structural frame 180 may be partially or mostly contained within the frame 103 and its guarding, for example.

Generally, as shown the partial overhead view of FIG. 13, in an embodiment, the post-processing subsystem 130 may include one subsystem or device, or multiple subsystems or devices therein. In the exemplary illustrated embodiment, the post-processing subsystem 130 includes multiple items, e.g., a first (e.g., front) container 182, a second (e.g., middle) container 184, and a third (e.g., back) container 186, each of which may be accessible through an open top portion thereof via the robotic arm 102 for insertion of the processed tube therein. In an embodiment, the first container 182 is a cleaning container. In one embodiment, the first container 182 is an ultrasonic tank 182, the second container 184 is a rinse tank 184, and the third container 186 is a container that is part of a drying system.

In an embodiment, the ultrasonic tank 182 and the rinse tank 184 may be provided on the structural frame 180, while drying system is provided on a different frame.

FIG. 14 shows an example of placing the tanks 182, 184 on the frame 180. The tanks and frame may be defined in a space, e.g., having a length $L_C$, width $W_C$, and height $H_C$.

During operation of the production system 100, a processed tube may be moved from the laser cutting subsystem 128 via robotic arm 102 and placed into the ultrasonic tank 182. The ultrasonic tank 182 may ultrasonically clean each processed tube by application of ultrasonic current to the tank 182 and its contents. The ultrasonic tank 182 has an opening at its top and walls that are sized to accommodate various lengths of tubes placed therein. The ultrasonic 182 tank holds, for example, water, an ultrasonic detergent, or a solvent therein for cleaning the tubes. The ultrasonic tank 182 may be activated for a period of time, e.g., between approximately 5 minutes to approximately 20 minutes, in order to clean the tube. The ultrasonic tank 182 may dislodge and remove any loose debris left on or inside the tube.

While the above embodiment describes use of an ultrasonic tank 182 for post-processing and cleaning of the laser cut tube, use of ultrasound for cleaning a cut tube is not meant to be limiting. In an embodiment, the laser cut tube may be cleaned using alternate methods, including, but not limited to, an electropolishing system and/or abrasive cleaning device and methods such as bead blasting or sand blasting, and/or a combination of such cleaning methods. Accordingly, the cleaning system or device used as part of the post-processing system 130 is not intended to be limited in any way, and any number of cleaning systems and/or processes may be used.

As mentioned, in the exemplary illustrated embodiment, the post-processing system 130 includes multiple devices for post-processing the cut tube. In one embodiment, the robotic arm 102 may then grasp the tube and move it from the ultrasonic tank 182 (or other cleaning device/system) and into the rinse tank 184, in accordance with one embodiment. The rinse tank 184 has an opening at its top and walls that are sized to accommodate various lengths of tubes placed therein. In an embodiment, a length of the tank 184 is based on a length of the tubes being processed. The rinse tank 184 holds a rinsing agent or fluid therein for rinsing each tube. In an embodiment, the rinsing agent is water. By placing and/or using the rinse tank 184 after the ultrasonic tank 182, the rinse tank 184 washes off any fine debris remaining from ultrasonic cleaning, as well as remove the ultrasonic detergent used in the ultrasonic tank 182. The cleaning system 130 includes a pump and a nozzle to agitate the rinse water. A pump 181 may be attached to piping 183 provided on the tank 184 to pump and circulate the rinsing fluid (e.g. water) within the tank. Rinsing may take place for a period of time to assist in removal of any additional debris on the tube. After rinsing, the tube is removed from the rinse tank 184 via the robotic arm 102. Of course, it should be understood that rinsing is an option and is not required. Further, the illustrated tank 184 is provided as an example only and need not be provided; e.g., other rinsing techniques such as via a hose, sprinkler, or other device, may be utilized as part of the post-processing. In another embodiment, rinsing of the tube may take place without cleaning of said tube beforehand.

After being rinsed and/or removed from the rinse tank 184, in one embodiment, each tube may be moved to the drying subsystem 186, shown in FIG. 15. The drying subsystem 186 is designed to dry the tube after it has been cleaned and rinsed. In one embodiment, the drying subsystem may be used without cleaning. In another embodiment, the drying subsystem 186 may be used on its own, without cleaning or rinsing, simply to move or blow away any particles, shavings, slag, or debris left on or in the tube as a result of the laser cutting. A tube must be completely dry before it can be inspected because any slots/holes/pores in the tube which are filled with water and/or debris cannot be backlit for machine vision inspection. In one embodiment, for tube handling, this subsystem 186 may use similar concepts and components as the inspection subsystem 122. For example, the drying system 186 may include a structural frame 188 and securement devices 192 configured to secure each tube received therein in a horizontal or longitudinal direction (relative to the width W of the frame 103). The frame 188 may be the same or separate from frame 180. The frame 188 may be defined in a space, e.g., having a length $L_D$, width $W_D$, and height $H_D$.

In an embodiment, each securement device 190 includes a spring-loaded rod that is used to hold and support the tube (135) being inspected. In one embodiment, the rod is configured to hold and support the tube being inspected via or from the inside diameter of the tube. The spring-loaded rod may be supported by two bearings, for example, and configured to move axially for the spring-loaded support and radially so it may rotate with the tube while the tube is being inspected. In one embodiment, the securement device(s) 192 are controlled by a pneumatic piston actuator, enabling the spring-loaded rod to be pressed against a tube (135) in order to hold it in place while being inspected. At least one of the securement devices 192 includes a rotation device 190, e.g., a servo-motor, associated therewith for rotating each tube mounted therein relative to the system along a longitudinal or horizontal axis B-B. In an embodiment, each securement device 192 includes a rotation device 190.

The drying system 186 may also include a dryer 198, hot air blower, or heat gun, as well as an air nozzle 199, each having a delivery nozzle that is directed towards a tube to dry each tube that is secured in the system 186. The drying system 186 also may include motion controls (including a second servo-motor) and at least one linear slide 194. The controls and slide(s) may be associated with a pair of guide/tracking rails 196 mounted to the frame 188 for moving the dryer 198 and air nozzle 199 relative to the secured tube. In an embodiment, the dryer 198 and air nozzle 199 are configured to move back and forth horizontally along axis B-B relative to the tube (via the servo-motor and slide 194 guiding the devices along the rails 196), to dry the surface of the tube. The securement device(s) 192 of the drying system 186 may rotate the secured tube via motor 190 while the air nozzle 199 and/or hot air blower translate overhead. The air nozzle 199 of the drying system 186 may be used to remove a majority of the water. The hot air blower/dryer 198 and air nozzle 199 may be connected to a compressor (not shown) designed to feed air from the delivery nozzle of each device. In an embodiment, the air nozzle 199 is activated first. After most of the water has been removed, a hot air blower or dryer 198 may be activated to provide heated air and blow it onto the tube to boil off any remainder of the water. In another embodiment, the air nozzle 199 and dryer 198 are activated in an alternating manner. In yet another embodiment, the air nozzle 199 and dryer 198 are activated simultaneously.

Once the tube is dried by the drying system 186 of the post-processing subsystem 130, the robotic arm 102 grasps the tube and moves it to the inspection subsystem 122 for inspection via the post inspection subsystem 126.

It again should be noted that the use of each of the above-described examples, i.e., ultrasound tank 182, rinse tank 184, and/or drying subsystem 186 is/are optional and need not be part of the post-processing subsystem 130. That is, the post-processing subsystem 130 may include a single device, e.g., just an ultrasonic tank 182, electropolisher, abrasive cleaning device, etc. In another embodiment, the post-processing subsystem 130 may only include a rinsing tank, or only include a drying system/air nozzle.

In addition to the previously noted steps in the method of using the production system 100 as generally noted with reference to FIG. 3, then, further steps may also be included in the method, which should be understood by the above description as well as viewing the steps illustrated by FIGS. 16-23. FIG. 16 shows an isometric of the entire production system. With this section as with many of the other section it would be good to be very generic so we have flexibility with how we orient the system and add or remove additional stations. The produce part should also be vague as the length, diameter, material, and overall size of it is variable and any of these parameters can change.

The tubes will be conveyed by a robotic arm by moving the tube to and from each subsystem. The process begins by the robotic arm taking the tube from the tube loader and placed in the inspection system. The inspection system will check for roundness and imperfections to ensure that the tube is within specification, for example. Once a tube is approved it will be transported to the laser cutting machine. In a system that includes a post-processing subsystem, the slotted/cut tube will then be moved to the post-processing subsystem where it gets post-processed (e.g., in one embodiment, ultrasonically cleaned, rinsed, and dried respectively). After post-processing, the tube will be transported back to the inspection system to ensure that the slot/hole and porosity are within the required specifications. Alternately, the slotted/cut tube may be moved from the laser cutting machine to the inspection system. The approved tubes will be sent to the tube storage or completed tubes where they can be packaged and prepared for shipping.

Figure 23:
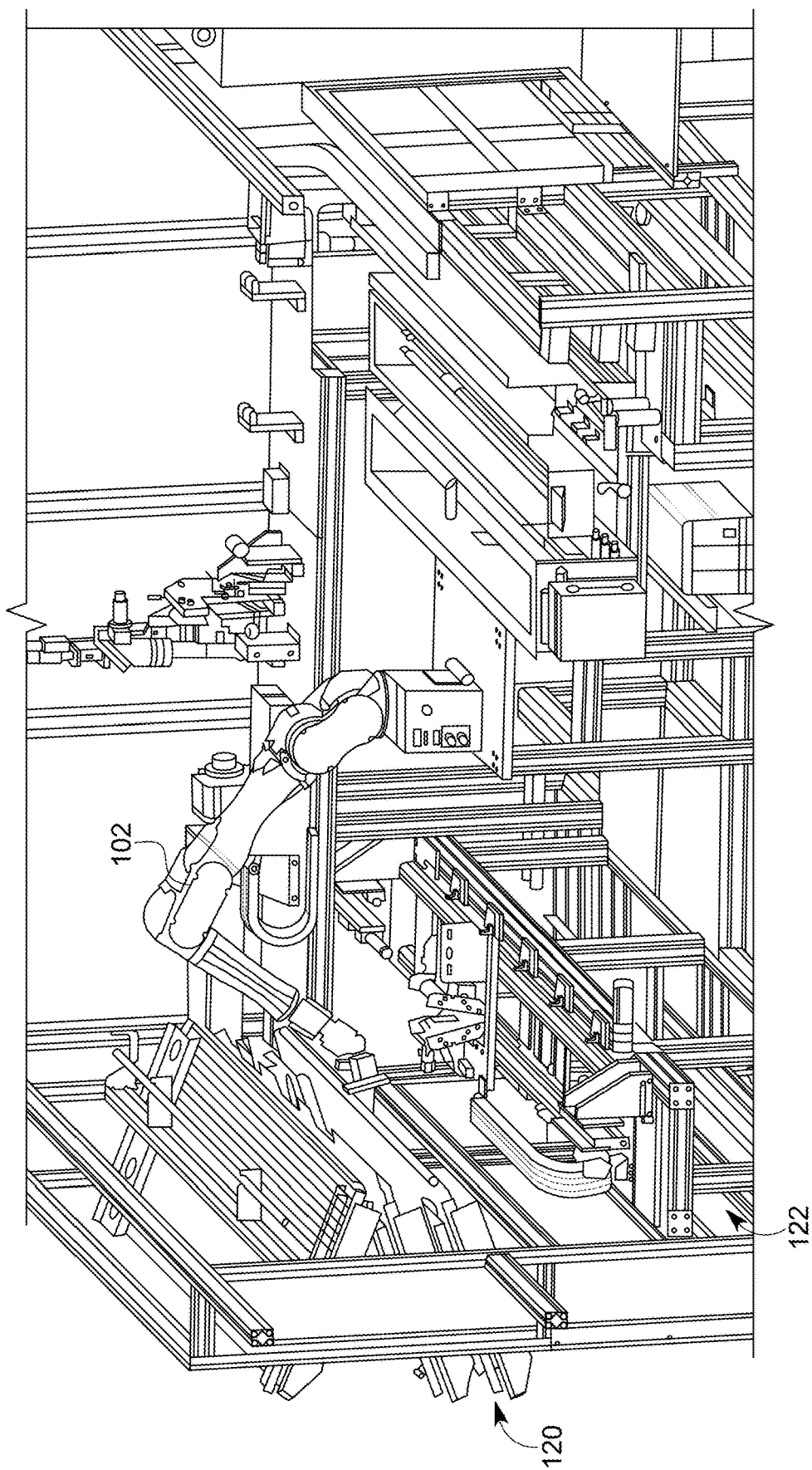

The entire process may be automated and controlled by a programmable logic controller (PLC), controller, or computer (e.g., at workstation 106, 108, 110) that controls how all the various systems communicate. An operator does not need to be at the desk during production and will be signaled by a light should someone need to intervene for any reason. For example, after inspecting the tube using the post-inspection system, the method may include moving the tube via the robotic arm from the post-inspection system to the tube input-output subsystem 120 (see FIG. 23, showing the tube being moved to the bottom tray 136 for use as a filtration tube). The method also may include a step wherein the robotic arm is configured to deposit each tube that has failed inspection into a second/middle tray 134. Further, inspecting each tube may include inspecting the tube using the pre-inspection system by scanning the surface of each tube with a laser from the laser optical micrometer (see FIG. 17) and/or inspecting the tube using the post-inspection system by scanning the surface of each tube with the camera (see FIG. 22). Inspection additionally may include moving at least part of the pre-inspection system and/or post-inspection system horizontally relative to the tube, rotating the tube using a rotation device, and scanning the surface of the tube. Post-processing the tube may include processing the tube after laser cutting. In one embodiment, post-processing may include moving the tube into and cleaning each tube, e.g., in the ultrasonic bath tank (see FIG. 19) or other cleaning device/system, moving the tube into and rinsing each tube after the cleaning with the rinse tank (see FIG. 20), and moving the tube into and drying each tube with the dryer and/or drying system (see FIG. 21). Drying each tube may include moving the dryer horizontally relative to the tube to dry the surface of the tube. The drying process may also include rotating the tube using a rotation device as the dryer moves along a length of the tube.

The length of the tubes being processed by production system 100 may vary, e.g., 1.1 meters, 1.64 meters (1640 mm), etc. Accordingly, the length of parts of the subsystems (inspection system, tube post-processing system, and the tube input-output system) may increase/decrease based on the length of the tubes being processed. A length of the laser cutting system supports may also vary based on the length of the tubes.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A production system for processing and inspecting tubes to form filtration tubes, the system comprising:
   a six-axis robotic arm configured to move each tube between a plurality of sub-systems, the plurality of sub-systems comprising:
   a tube input-output subsystem configured to hold a plurality of tubes, the robotic arm being configured to withdraw a tube for processing from the tube input-output subsystem;
   an inspection system configured to receive and inspect the tube placed therein by the robotic arm, the inspection system configured to inspect the tube by scanning a surface of the tube to determine presence of abnormalities, defects, and/or quality issues; and
   a laser cutting system configured to receive the tube via the robotic arm moving said tube to the laser cutting system, the laser cutting system being configured to cut a plurality of slots, holes, and/or pores into and through a wall of the tube to form a filtration tube that is configured to filter solids from fluids.

2. The system according to claim 1, further comprising a post-processing system for processing the tube cut by the laser cutting system, the robotic arm being configured to move the tube from the laser cutting system and into the post-processing system.

3. The system according to claim 2, wherein the post-processing system comprises a cleaning system, an ultrasonic bath tank, an electropolishing system, a bead blasting system, a sand blasting system, and/or an abrasive cleaning device for cleaning the tube.

4. The system according to claim 2, wherein the post-processing system comprises a rinse tank comprising a rinsing agent therein for rinsing the tube.

5. The system according to claim 2, wherein the post-processing system comprises a dryer configured to dry the tube, wherein the dryer is a part of a drying system and is configured to move horizontally relative to the tube to dry the surface of the tube.

6. The system according to claim 1, wherein the inspection system comprises a pre-inspection system and a post-inspection system,
   the pre-inspection system configured to receive and inspect the tube withdrawn by the robotic arm from the tube input-output subsystem, the pre-inspection system further being configured to inspect the tube by scanning a surface of the tube to determine presence of abnormalities in dimensions and/or defects in said tube and to determine each tube without said abnormalities and/or defects that has passed pre-inspection; and
   the post-inspection system configured to receive and inspect the tube collected by the robotic arm, the post-inspection system further being configured to inspect the tube by scanning the surface of the tube to determine at least quality and porosity of the tube after being cut by the laser cutting system and to determine each tube that has passed post-inspection,
   wherein the robotic arm is further configured to move the tube from the post-inspection system.

7. The system according to claim 1, wherein the plurality of tubes held by the tube input-output subsystem comprises (a) tubes that are unprocessed and uninspected, (b) tubes that have failed inspection as a result of inspection via the inspection system, and (c) tubes that have passed inspection after cutting via the laser cutting system and are configured for use as filtration tubes, wherein the robotic arm is configured to withdraw the tube for processing from the tubes that are unprocessed and uninspected for inspection by the inspection system, and wherein the robotic arm is configured to move the tube from the inspection system to the filtration tubes of the tube input-output subsystem.

8. The system according to claim 7, wherein the tube input-output subsystem comprises a first tray to hold the unprocessed and uninspected tubes, a second tray to hold the tubes that have failed inspection, and a third tray to hold tubes configured for use as filtration tubes.

9. The system according to claim 8, wherein each tray is configured for locking at a non-zero angle relative to a horizontal plane extending across a floor upon which the production system is placed.

10. The system according to claim 8, wherein each tray comprises a receiving slot for receiving and guiding tubes along a surface of the respective tray.

11. The system according to claim 1, wherein the inspection system comprises a laser optical micrometer for scanning the surface of the tube.

12. The system according to claim 1, wherein the inspection system comprises a camera for scanning the surface of the tube during its inspection.

13. The system according to claim 1, wherein the inspection system comprises a frame, a securement device configured to secure the tube therein in a horizontal direction, and a rotation device for rotating the tube relative to the inspection system.

14. The system according to claim 13, wherein the inspection system is configured to move horizontally relative to the secured tube to inspect and scan the surface of the tube as it is rotated by the rotation device.

15. The system according to claim 13, wherein the inspection system further comprises a motor and a pair of tracking rails mounted to the frame for moving the inspection system relative to the secured tube.

16. The system of claim 1, further comprising an additional laser cutting system being configured to cut a plurality of slots, holes, and/or pores into and through a wall of the tube placed therein via the robotic arm to form a filtration tube that is configured to filter solids from fluids.

17. A method for processing and inspecting filtration tubes using a production system comprising a six-axis robotic arm configured to move tubes between a plurality of sub-systems, the plurality of sub-systems comprising: a tube input-output subsystem configured to hold a plurality of tubes, the robotic arm being configured to withdraw a tube for processing from the tube input-output subsystem, an inspection system configured to receive and inspect the tube placed therein by the robotic arm, the inspection system configured to inspect the tube by scanning a surface of the tube to determine presence of abnormalities, defects, and/or quality issues, and a laser cutting system configured to receive the tube via the robotic arm moving said tube to the laser cutting system, the laser cutting system being configured to cut a plurality of slots, holes, and/or pores into and through a wall of the tube to form a filtration tube that is configured to filter solids from fluids; the method comprising:
   withdrawing a tube for processing from the tube input-output subsystem using the robotic arm;
   moving the tube using the robotic arm to the inspection system for inspection;
   inspecting the tube by scanning a surface of the tube using the inspection system to determine presence of abnormalities, defects and/or quality issues in said tube and to determine the tube that has passed inspection or that is defective;

moving the inspected tube to the laser cutting system using the robotic arm, or, else, moving a defective tube back to the tube input-output subsystem using the robotic arm; and for each tube passing inspection, cutting a plurality of slots, holes, and/or pores into and through a wall of the tube to form a filtration tube that is configured to filter solids from fluids using the laser cutting system.

18. The method according to claim 17, wherein the production system further comprises a post-processing system for processing the tube cut by the laser cutting system, the robotic arm being configured to move the tube from the laser cutting system and into the post-processing system; wherein the method further comprises:

moving the cut tube from the laser cutting system into the post-processing system using the robotic arm; and processing the tube cut by the laser cutting system using the post-processing system.

19. The method according to claim 18, wherein the post-processing system comprises a cleaning system, an ultrasonic bath tank, an electropolishing system, a bead blasting system, a sand blasting system, and/or abrasive cleaning device, and wherein the post-processing of the tube comprises cleaning the tube using at least one of said systems, tank, or device.

20. The method according to claim 18, wherein the post-processing system further comprises a rinse tank comprising a rinsing agent therein, and wherein the post-processing of the tube further comprises rinsing the tube.

21. The method according to claim 18, wherein the post-processing system comprises a dryer, and wherein the post-processing the tube further comprises drying the tube by moving the dryer horizontally relative to the tube.

22. The method according to claim 17, wherein, after the cutting, the method further comprises:

moving the tube from the laser cutting system to the inspection system using the robotic arm; and inspecting the tube using the inspection system by scanning the surface of the tube to determine at least quality and porosity of the tube after being cut by the laser cutting system and to determine the tube that has passed inspection.

23. The method according to claim 22, wherein the robotic arm is configured to deposit each tube that has failed inspection into a first tray of the tube input-output subsystem and wherein the robotic arm is configured to deposit each tube that has passed inspection into a second tray of the tube input-output subsystem.

24. The method according to claim 17, wherein the inspection system comprises a laser optical micrometer, and wherein the inspecting the tube using the inspection system comprises scanning the surface of the tube with a laser from the laser optical micrometer.

25. The method according to claim 17, wherein the inspection system comprises a camera, and wherein the inspecting the tube using the inspection system comprises scanning the surface of the tube with the camera.

26. The method according to claim 17, wherein the inspecting by the inspection system moving at least part of the inspection system horizontally relative to the tube, rotating the tube using a rotation device, and scanning the surface of the tube.

* * * * *